(12) United States Patent
Li et al.

(10) Patent No.: US 11,191,029 B2
(45) Date of Patent: Nov. 30, 2021

(54) OPEN-LOOP POWER CONTROL METHOD AND DEVICE

(71) Applicant: XI'AN ZHONGXING NEW SOFTWARE CO., LTD., Shaanxi (CN)

(72) Inventors: Jian Li, Shenzhen (CN); Peng Hao, Shenzhen (CN); Junfeng Zhang, Shenzhen (CN); Yan Xue, Shenzhen (CN); Xiao Yan, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 0 days.

(21) Appl. No.: 16/087,238

(22) PCT Filed: Mar. 22, 2017

(86) PCT No.: PCT/CN2017/077763
§ 371 (c)(1),
(2) Date: Dec. 27, 2018

(87) PCT Pub. No.: WO2017/162180
PCT Pub. Date: Sep. 28, 2017

(65) Prior Publication Data
US 2019/0141638 A1 May 9, 2019

(30) Foreign Application Priority Data
Mar. 23, 2016 (CN) .......................... 201610168515.1

(51) Int. Cl.
*H04W 52/10* (2009.01)
*H04W 52/36* (2009.01)
(Continued)

(52) U.S. Cl.
CPC ......... *H04W 52/10* (2013.01); *H04W 52/146* (2013.01); *H04W 52/242* (2013.01);
(Continued)

(58) Field of Classification Search
CPC ... H04W 52/10; H04W 52/50; H04W 52/247; H04W 52/242; H04W 52/367; H04W 52/245; H04W 52/146; H04W 74/0833
See application file for complete search history.

(56) References Cited

U.S. PATENT DOCUMENTS 5,564,075 A * 10/1996 Gourgue ............. H04W 52/322
455/522
8,009,639 B2 * 8/2011 Howard ................ H04J 3/1694
370/337
(Continued)

FOREIGN PATENT DOCUMENTS

CN 102026356 A 4/2011
CN 101159459 B 2/2013
(Continued)

OTHER PUBLICATIONS

International Search Report in international application No. PCT/CN2017/077763, dated Jun. 27, 2017, 2 pgs.
(Continued)

*Primary Examiner* — Jinsong Hu
*Assistant Examiner* — Rui M Hu
(74) *Attorney, Agent, or Firm* — Cantor Colburn LLP

(57) ABSTRACT

Disclosed in the embodiments of the present invention are an open-loop power control method and device, relating to the field of wireless communications and comprising: sending a first signal/channel to a second wireless node; indicating the transmission power of said first signal/channel to the second wireless node; or sending the first signal/channel and a fourth signal/channel to the second wireless node; indicating the transmission power of said fourth signal/channel to the second wireless node; said transmission power is used by the second wireless node to calculate the downlink path loss and determine the transmission power of the uplink random-access signal. The invention is capable of
(Continued)

ensuring, in a user-centered access context, that an appropriate transmission power is used to send an uplink random-access request, thus resisting the impact of path loss and preventing interference between uplink users.

17 Claims, 14 Drawing Sheets

(51) Int. Cl.
H04W 52/24 (2009.01)
H04W 52/14 (2009.01)
H04W 52/50 (2009.01)

(52) U.S. Cl.
CPC ....... *H04W 52/245* (2013.01); *H04W 52/247* (2013.01); *H04W 52/367* (2013.01); *H04W 52/50* (2013.01)

(56) References Cited

U.S. PATENT DOCUMENTS

| | | | |
|---|---|---|---|
| 8,965,443 B2 | 2/2015 | Gao | |
| 9,072,055 B2* | 6/2015 | Jongren | H04W 52/10 |
| 9,107,173 B2 | 8/2015 | Gao | |
| 9,635,624 B2 | 4/2017 | Xu | |
| 10,212,673 B2* | 2/2019 | Angiwal | H04W 64/006 |
| 2002/0160798 A1* | 10/2002 | Shoji | H04W 72/085 |
| | | | 455/522 |
| 2005/0143121 A1* | 6/2005 | Huh | H04W 52/10 |
| | | | 455/522 |
| 2005/0282574 A1* | 12/2005 | Li | H04W 52/06 |
| | | | 455/522 |
| 2006/0035660 A1 | 2/2006 | Anderson | |
| 2007/0202901 A1* | 8/2007 | Hulbert | H04W 16/14 |
| | | | 455/501 |
| 2010/0022190 A1* | 1/2010 | Laroia | H04W 40/12 |
| | | | 455/67.11 |
| 2010/0120370 A1* | 5/2010 | Ishii | H04B 17/309 |
| | | | 455/67.11 |
| 2012/0184312 A1* | 7/2012 | Yamamoto | H04J 11/0056 |
| | | | 455/502 |
| 2012/0213109 A1* | 8/2012 | Xu | H04B 7/024 |
| | | | 370/252 |
| 2012/0302174 A1* | 11/2012 | Watanabe | H04W 36/0085 |
| | | | 455/67.11 |
| 2012/0329503 A1* | 12/2012 | Jongren | H04W 52/10 |
| | | | 455/509 |
| 2013/0028180 A1* | 1/2013 | Gao | H04W 74/0833 |
| | | | 370/328 |
| 2013/0029657 A1* | 1/2013 | Gao | H04W 74/0833 |
| | | | 455/422.1 |
| 2013/0265981 A1* | 10/2013 | Yang | H04W 52/146 |
| | | | 370/329 |
| 2014/0113677 A1* | 4/2014 | Parkvall | H04W 52/242 |
| | | | 455/522 |
| 2014/0161093 A1* | 6/2014 | Hoshino | H04B 7/024 |
| | | | 370/329 |
| 2014/0177601 A1* | 6/2014 | Nishio | H04W 76/27 |
| | | | 370/332 |
| 2015/0045085 A1* | 2/2015 | Kishiyama | H04W 52/241 |
| | | | 455/522 |
| 2015/0092670 A1* | 4/2015 | Makhlouf | H04W 52/265 |
| | | | 370/329 |
| 2015/0173029 A1* | 6/2015 | Fujishiro | H04W 52/30 |
| | | | 370/328 |
| 2015/0351117 A1* | 12/2015 | Rahman | H04L 5/1469 |
| | | | 370/252 |
| 2015/0358802 A1* | 12/2015 | Nagata | H04W 52/0261 |
| | | | 370/329 |
| 2015/0373650 A1 | 12/2015 | Gholmieh | |
| 2016/0205668 A1* | 7/2016 | Fujishiro | H04W 72/02 |
| | | | 370/330 |
| 2016/0219528 A1* | 7/2016 | Kawasaki | H04W 28/04 |
| 2016/0227485 A1* | 8/2016 | Davydov | H04W 52/242 |
| 2017/0105240 A1* | 4/2017 | Chen | H04W 72/0446 |
| 2017/0188191 A1* | 6/2017 | Aldana | G01S 11/08 |
| 2017/0188330 A1* | 6/2017 | Bischinger | H04W 52/283 |
| 2017/0215154 A1* | 7/2017 | Kim | H04W 52/34 |
| 2018/0014260 A1* | 1/2018 | Ren | H04W 52/362 |
| 2018/0041971 A1* | 2/2018 | Agiwal | H04W 4/021 |
| 2019/0059006 A1* | 2/2019 | Ahn | H04W 24/10 |
| 2019/0059111 A1* | 2/2019 | Zhang | H04W 52/18 |
| 2019/0191290 A1* | 6/2019 | Poitau | H04W 76/14 |

FOREIGN PATENT DOCUMENTS

| | | |
|---|---|---|
| CN | 103037398 A | 4/2013 |
| CN | 103037491 A | 4/2013 |
| CN | 103392299 A | 11/2013 |
| CN | 103444237 A | 12/2013 |
| CN | 103718612 A | 4/2014 |
| CN | 104412673 A | 3/2015 |
| CN | 102395184 B | 8/2015 |
| CN | 105103630 A | 11/2015 |
| CN | 105208644 A | 12/2015 |

OTHER PUBLICATIONS

English Translation of the Written Opinion of the International Search Authority in international application No. PCT/CN2017/077763, dated Jun. 27, 2017, 6 pgs.
3GPP TS 36.321 V12.0.0, Dec. 2013, Technical Specification Group Radio Access Network; Evolved Universal Terrestrial Radio Access(E-UTRA); Medium Access Control (MAC) protocol specification (Release 12), 57 pgs.
Overview of 3GPP Release 11 V0.2.0, Sep. 2014, 179 pgs.
Chinese Office Action for corresponding application 201610168515.1; dated Jan. 22, 2020.
Chinese Office Action for corresponding application 201610168515.1; dated Sep. 10, 2020.
Chinese Search Report for corresponding application 201610168515.1; dated Jan. 22, 2020.

* cited by examiner

| Synchronization signal/channel ID1 | Transmitting power level1 |
|---|---|
| Synchronization signal/channel ID2 | Transmitting power level1 |
| Synchronization signal/channel ID3 | Transmitting power level2 |
| Synchronization signal/channel ID4 | Transmitting power level2 |

FIG. 14

| ID | Transmitting power level | Indicator bit |
|---|---|---|
| Synchronization signal/channel ID1 | Transmitting power level1 | 0 |
| Synchronization signal/channel ID2 | Transmitting power level1 | 1 |
| Synchronization signal/channel ID3 | Transmitting power level2 | 0 |
| Synchronization signal/channel ID4 | Transmitting power level2 | 1 |

FIG. 15

OPEN-LOOP POWER CONTROL METHOD AND DEVICE

TECHNICAL FIELD

The disclosure relates to the field of wireless communications, and in particular to a method and a device for open-loop power control.

BACKGROUND

At present, a primary requirement of mobile communication comes from the development of mobile Internet, especially the development of intelligent terminals stimulates surge of data traffic of mobile communication. By 2020 and in future, services of the mobile Internet and Internet of Things will become key drivers of the development of mobile communication. In the 3rd Generation Partnership Project (3GPP), heterogeneous networks are proposed and a function of an enhancement of small cell is introduced in a Long-Term Evolution Advance (LTE-A) system. However, it is generally assumed that a maximum number of the small cells under a coverage of the same macro base station is 4 or 10, and this density is far from enough for capacity requirements in future 10 years. In the 5th Generation (5G), the following demands are proposed: improving a spectrum efficiency, improving a network density, increasing a system bandwidth, dispersion of intelligent traffic, reducing a control overhead of system broadcasting and the like. An Ultra Dense Network (UDN) is proposed under this background. In the UDN network, Transmit Points (TP) have a very large density (dozens to hundreds of small base stations are included in one macro base station). A coverage range of the TP is further narrowed (dozens or even tens of meters). Each TP may only serve one or more users, and the TP not serving enters a dormant state or an off state. Therefore, it is required to consider a user-centric access mode in the 5G system. A response is made only when the user has a demand, so as to achieve the purpose of saving energy of the base station and reducing the inter-cell interference.

For a conventional Long-Term Evolution (LTE) network, mechanisms of a cell discovery and user access are described as follows. Each cell needs to transmit a Primary Synchronization Signal (PSS) and a Secondary Synchronization Signal (SSS) at a period of 5 ms. A User Equipment (UE) detects a synchronization signal to achieve synchronization and obtain a cell identity. Each cell transmits a Cell-specific Reference Signal (CRS) on multiple symbols of each sub-frame of 1 ms. A user measures the CRS to obtain a Reference Signal Received Power (RSRP) and selects a serving cell. Each cell broadcasts a Master Information Block (MIB) to all the UEs in the cell at a period of 10 ms via a Physical Broadcast Channel (PBCH), and transmits a Physical Downlink Shared Channel (PDSCH) carrying a System Information Block (SIB) at a high frequency. After detecting these system information blocks successfully, the UE obtains uplink access information, and then performs an uplink access. It can be seen that, transmitting frequencies of these common channels/signals are high, which results in a high overhead of occupied resources and a large interference to a neighboring cell.

In the small cell in Release 12 of the 3GPP, a Discovery Reference Signal (DRS) and a small cell on/off mechanism are introduced to reduce a power overhead and the inter-cell interference. If there is no service requirement, the small cell transmits the DRS at a period of 40 ms or more, and turns off the transmission of other signals. After the DRS is detected by a terminal, the small cell turns on normal transmission of the signals, and performs service transmission. By using this mechanism, the power in a non-service period can be saved, and the interference to the neighboring cell can be reduced. However, this mechanism has two problems. The first problem is that, the terminal needs to notify the macro base station after detecting the DRS, and then the macro base station wakes up the small cell. For the 5G system, when the system networks in isolation, it is impossible to depend on a previous network, therefore, the wake-up mechanism is not available. The second problem is that, the DRS is a combination of the conventional CRS and PSS/SSS, although the transmitting frequency is limited, these signals are still periodic and the power overhead is high. Therefore, when there is no need to read the CRS and the PSS/SSS, the power is wasted, and it needs to further reduce a transmitting ratio of the related signals.

From the above, the existing cell discovery and user access mechanism is difficult to support the UDN and satisfy requirements of the 5G for reducing the system overhead and being user-centric, and it cannot achieve an energy-saving effect. Therefore, a new Radio Access Technology (RAT) system of the 5G needs to provide a terminal-centric access mode to achieve fast access of the terminal, reduce the types of the common signals/channels, reduce a sending frequency of the common signal, and reduce a transmitting power of the base station largely, so as to achieve the purpose of saving energy of the base station.

In order to solve the above problems, cell discovery and synchronization may be implemented by using a New Discovery Reference Signal (N-DRS) which is similar to a synchronization signal in the LTE system. The N-DRS may be sent on a narrowband at a low density, and a transmission period may be longer. The terminal further obtains some necessary access configuration information. The access configuration information may be obtained from a payload of the DRS, a base station of the LTE system as assistance, or a broadcast signal/channel. The terminal can initiate an uplink random access request after obtaining the access configuration information. The payload is different from the broadcast signal/channel, and can be understood as a part of the N-DRS, that is, the N-DRS includes a DRS sequence and the payload.

However, the CRS and the SIB parts are decreased in the above process, and it is unknown how much the transmitting power is used to transmit the uplink random access request by the terminal. Therefore, it is required to provide a method for open-loop power control to resist a path loss and prevent interference between uplink users.

SUMMARY

The following is an overview of the subject matter described in detail herein. The overview is not intended to limit the scope of protection of the claims.

In view of this, the embodiments of the disclosure provide a method and a device for open-loop power control, which can ensure that an appropriate transmitting power is used to send an uplink random access request in a user-centric access scenario, thereby resisting an effect of a path loss and preventing interference between uplink users.

The embodiments of the disclosure provide a method for open-loop power control, which is applied to a first wireless node. The method includes the following operations.

A first signal/channel is sent to a second wireless node; a transmitting power of the first signal/channel is indicated to the second wireless node; or a first signal/channel and a fourth signal/channel are sent to a second wireless node; a transmitting power of the fourth signal/channel is indicated to the second wireless node;

the transmitting power is used to calculate a downlink path loss and determine an uplink transmitting power by the second wireless node.

Alternatively, the operation that the transmitting power of the first signal/channel is indicated to the second wireless node may include at least one of the following actions.

The transmitting power of the first signal/channel is carried in a second signal/channel or a third signal/channel and is sent to the second wireless node;

the first signal/channel is configured to indicate an acquisition mode of the transmitting power of the first signal/channel; or a mapping relationship is provided between the transmitting power of the first signal/channel and an ID of the first signal/channel.

Alternatively, the operation that the transmitting power of the fourth signal/channel is indicated to the second wireless node may include at least one of the following actions.

The transmitting power of the fourth signal/channel is carried in the second signal/channel or the third signal/channel and is sent to the second wireless node; or the first signal/channel is configured to indicate an acquisition mode of the transmitting power of the fourth signal/channel.

Alternatively, the second signal/channel or the third signal/channel may include open-loop power control parameters.

Alternatively, a transmission period and/or a frequency of the second signal/channel may be the same as a transmission period and/or a frequency of the first signal/channel Or, there may be a multiple relationship between a transmission period and/or a frequency of the second signal/channel and a transmission period and/or a frequency of the first signal/channel.

Alternatively, a time domain resource and/or a frequency domain resource occupied for sending the second signal/channel may be located on a fixed physical resource. Or, there may be a location correspondence between a location of a time domain resource and/or a location of a frequency domain resource occupied for sending the second signal/channel and a location of a time domain and/or a location of a frequency domain resource occupied for sending the first signal/channel.

Alternatively, the third signal/channel may include at least one access configuration message. The access configuration message carries a transmitting power for sending the first signal/channel or a transmitting power for sending the fourth signal/channel by the first wireless node using the access configuration message.

Alternatively, the third signal and the first signal/channel may be sent by different first wireless nodes.

Alternatively, the different first wireless nodes may be first wireless nodes in different systems; and the different systems may include one of Global System for Mobile Communications (GSM), Long-Term Evolution (LTE) system, Universal Mobile Telecommunication System (UMTS), and new Radio Access Type (RAT) system.

Alternatively, the operation that the first signal/channel indicates the acquisition mode of the transmitting power of the first signal/channel may include the following action.

The first signal/channel is configured to indicate that the transmitting power used to send the first signal/channel by the first wireless node is carried in the second signal/channel or the third signal/channel.

Alternatively, the operation that the first signal/channel is configured to indicate the acquisition mode of the transmitting power of the fourth signal/channel may include the following action.

The first signal/channel is configured to indicate that a transmitting power used to send the fourth signal/channel by the first wireless node is carried in the second signal/channel or the third signal/channel.

Alternatively, the first signal/channel may be used for synchronization and/or cell discovery and sent by occupying a part of a downlink bandwidth; and the fourth signal/channel may be sent on all of the downlink bandwidth discretely or continuously.

Alternatively, the open-loop power control parameters may include at least one of: maximum transmitting power information, target receiving power information, deviation information on power demands of different types of preamble sequences, accessing times information, information on a step size of incremental power, or compensation adjustment amount information.

Alternatively, the compensation adjustment amount information may be used for compensating a path loss or an uplink transmitting power.

Alternatively, a beam direction for sending the fourth signal/channel may be the same as a beam direction for sending the second signal/channel.

Alternatively, the second signal/channel or the third signal/channel may further include: access compensation adjustment amount information and/or information on the number of the first wireless nodes.

The embodiments of the disclosure further provide a method for open-loop power control, which is applied to a second wireless node. The method includes the following operations.

A first signal/channel from a first wireless node is received, and a receiving power of the first signal/channel is measured and obtained; a transmitting power of the first signal/channel and/or open-loop power control parameters are/is obtained; or a fourth signal/channel from the first wireless node is received, and a receiving power of the fourth signal/channel is measured and obtained; a transmitting power of the fourth signal/channel and/or open-loop power control parameters is obtained; and a downlink path loss is calculated and an uplink transmitting power is determined.

Alternatively, the operation that the transmitting power of the first signal/channel or the transmitting power of the fourth signal/channel from the first wireless node, and/or the open-loop power control parameters are/is received may include the following actions.

The transmitting power of the first signal/channel or the transmitting power of the fourth signal/channel from the first wireless node is obtained in the second signal/channel or a third signal/channel; or the transmitting power of the first signal/channel from the first wireless node is obtained according to a mapping relationship between the transmitting power of the first signal/channel and an ID of the first signal/channel; and/or the open-loop power control parameters are obtained from the second signal/channel or the third signal/channel.

Alternatively, a receiving period and/or a frequency of the second signal/channel may be the same as a receiving period and/or a frequency of the first signal/channel; or there may be a multiple relationship between a receiving period and/or a frequency of the second signal/channel and a receiving period and/or a frequency of the first signal/channel.

Alternatively, a time domain resource and/or a frequency domain resource occupied for receiving the second signal/channel may be located on the fixed physical resource, or there may be a location correspondence between a location of a time domain resource and/or a location of a frequency domain resource occupied for receiving the second signal/channel and a location of a time domain resource and/or a location of a frequency domain resource occupied for receiving the first signal/channel.

Alternatively, the open-loop power control parameters may include at least one of: maximum transmitting power information, target receiving power information, deviation information on power demands of different types of preamble sequences, accessing times information, information on a step size of incremental power, or compensation adjustment amount information.

Alternatively, the compensation adjustment amount information may be used for compensating a path loss or an uplink transmitting power.

Alternatively, the operation that the downlink path loss is calculated may include the following action.

The downlink path loss is calculated according to the receiving power of the first signal/channel or the fourth signal/channel and the transmitting power of the first signal/channel or the fourth signal/channel and/or the open-loop power control parameters.

Alternatively, the downlink path loss PL may be calculated according to the following formula:

$$PL = P1_{Tx} - P1_{RX},\ PL = P2_{Tx} - P2_{RX},\ PL = P1_{Tx} - P1_{RX} + \Delta\beta,\ \text{or}\ PL = P2_{Tx} - P2_{RX} + \Delta\beta,$$

where PL represents a path loss, $P1_{Tx}$ represents a transmitting power used to send the first signal/channel by the first wireless node and received by the second wireless node, $P1_{RX}$ represents a receiving power of the first signal channel, which is obtained by the second wireless node, $P2_{Tx}$ represents a transmitting power used to send the fourth signal/channel by the first wireless node and received by the second wireless node, $P2_{RX}$ represents a receiving power of the fourth signal/channel, which is obtained by the second wireless node, and $\Delta\beta$ represents a compensation adjustment amount.

Alternatively, the uplink transmitting power may include a transmitting power of an uplink random access signal; and the operation that the transmitting power of the uplink random access signal is determined may include the following action. The transmitting power of the uplink random access signal is calculated and determined according to the downlink path loss and/or the open-loop power control parameters.

Alternatively, the transmitting power $P_{RACH}$ of the uplink random access signal may be calculated according to the following formula:

$$P_{RACH} = \min(P_{max}, P_0 + PL),\ \text{or}\ P_{RACH} = \min(P_{max}, P_0 + PL + \Delta\beta),$$

where $P_{max}$ represents a maximum transmitting power of the second wireless node, $P_0$ represents a target receiving power, $\Delta\beta$ represents a compensation adjustment amount, PL represents a path loss, and $P_{RACH}$ represents the transmitting power of the uplink random access signal.

Alternatively, the operation that the receiving power of the first signal/channel is obtained may include the following actions.

High-level filtering is performed on the obtained receiving power of the first signal/channel; and the filtered receiving power is obtained.

Alternatively, the operation that the transmitting power of the first signal/channel is obtained may further include the following actions. Access compensation adjustment amount information from the first wireless node is received; and the access compensation adjustment amount information is used to select the first wireless node by the second wireless node.

Alternatively, the operation that the second wireless node selects the first wireless node may include the following action.

The second wireless node estimates a receiving power of a wideband signal based on the receiving power and the access compensation adjustment amount information from the first wireless node, and selects the first wireless node.

Alternatively, before the downlink path loss is calculated and the transmitting power of the uplink random access signal is determined, the method may further include the following operations.

Information on the number of the first wireless nodes from the first wireless node is received; and the transmitting power of the uplink random access signal is determined based on the information on the number of the first wireless nodes.

The embodiments of the disclosure further provide a device for open-loop power control, which is provided on a first wireless node. The device includes a first sending module and a first indicating module, or, a second indicating module and a second indicating module.

The first sending module is configured to send a first signal/channel to a second wireless node.

The first indicating module is configured to indicate a transmitting power of the first signal/channel to the second wireless node.

The second sending module is configured to send a first signal/channel and a fourth signal/channel to a second wireless node.

The second indicating module is configured to indicate a transmitting power of the fourth signal/channel to the second wireless node.

The transmitting power is used to calculate a downlink path loss and determine an uplink transmitting power by the second wireless node.

Alternatively, the operation that the first indicating module indicates the transmitting power of the first signal/channel to the second wireless node may include at least one of the following actions.

The transmitting power of the first signal/channel is carried in a second signal/channel or a third signal/channel and is sent to the second wireless node;

the first signal/channel is configured to indicate an acquisition mode of the transmitting power of the first signal/channel; or a mapping relationship is provided between the transmitting power of the first signal/channel and an ID of the first signal/channel.

Alternatively, the operation that the second indicating module indicates the transmitting power of the fourth signal/channel to the second wireless node may include at least one of the following actions.

The transmitting power of the fourth signal/channel is carried in the second signal/channel or the third signal/channel and is sent to the second wireless node; or the first signal/channel is configured to indicate an acquisition mode of the transmitting power of the fourth signal/channel.

Alternatively, the operation of the first indicating module that the first signal/channel indicates the acquisition mode of the transmitting power of the first signal/channel may include the following action.

The first signal/channel is configured to indicate that the transmitting power used to send the first signal/channel by the first wireless node is carried in the second signal/channel or the third signal/channel.

Alternatively, the operation of the second indicating module that the first signal/channel indicates the acquisition mode of the transmitting power of the fourth signal/channel may include the following action.

The first signal/channel is configured to indicate that a transmitting power used to send the fourth signal/channel by the first wireless node is carried in the second signal/channel or the third signal/channel.

Alternatively, the first sending module may be further configured to send the first signal/channel for synchronization and/or cell discovery by occupying a part of a downlink bandwidth; and the second sending module may be further configured to send the fourth signal/channel on all of the downlink bandwidth discretely or continuously.

Alternatively, a beam direction used to send the fourth signal/channel by the second sending module may be the same as a beam direction for sending the second signal/channel.

The embodiments of the disclosure further provide a device for open-loop power control, which is provided on a second wireless node. The device includes: a first receiving module, a first power module and a calculating module; or, a second receiving module, a second power module and a calculating module.

The first receiving module is configured to receive a first signal/channel from a first wireless node, measure and obtain a receiving power of the first signal/channel.

The first power module is configured to obtain a transmitting power of the first signal/channel and/or open-loop power control parameters.

The second receiving module is configured to receive a fourth signal/channel from the first wireless node, measure and obtain a receiving power of the fourth signal/channel.

The second power module is configured to obtain a transmitting power of the fourth signal/channel and/or open-loop power control parameters.

The calculating module is configured to calculate a downlink path loss and determine an uplink transmitting power.

Alternatively, the operation that the first power module obtains the transmitting power of the first signal/channel and/or the open-loop power control parameters, or the second power module obtains the transmitting power of the fourth signal/channel and/or the open-loop power control parameters may include the following actions.

The transmitting power of the first signal/channel or the transmitting power of the fourth signal/channel from the first wireless node is obtained in the second signal/channel or the third signal/channel; or the transmitting power of the first signal/channel from the first wireless node is obtained according to a mapping relationship between the transmitting power of the first signal/channel and an ID of the first signal/channel; and/or the open-loop power control parameters are obtained from the second signal/channel or the third signal/channel.

Alternatively, the operation that the calculating module calculates the downlink path loss may include the following action.

The downlink path loss is calculated according to the receiving power of the first signal/channel or the fourth signal/channel and the transmitting power of the first signal/channel or the fourth signal/channel and/or the open-loop power control parameters.

Alternatively, the calculating module may calculate the downlink path loss PL according to the following formula:

$$PL = P1_{Tx} - P1_{RX}, \ PL = P2_{Tx} - P2_{RX}, \ PL = P1_{Tx} - P1_{RX} + \Delta\beta, \text{ or } PL = P2_{Tx} - P2_{RX} + \Delta\beta,$$

where PL represents a path loss, $P1_{Tx}$ represents a transmitting power used to send the first signal/channel by the first wireless node and received by the second wireless node, $P1_{RX}$ represents a receiving power of the first signal/channel, which is obtained by the second wireless node, $P2_{Tx}$ represents a transmitting power used to send the fourth signal/channel by the first wireless node and received by the second wireless node, $P2_{RX}$ represents a receiving power of the fourth signal/channel, which is obtained by the second wireless node, and $\Delta\beta$ represents a compensation adjustment amount.

Alternatively, the uplink transmitting power may include a transmitting power of an uplink random access signal.

The operation that the calculating module determines the transmitting power may include the following action. The transmitting power of the uplink random access signal is calculated and determined according to the downlink path loss and/or the open-loop power control parameters.

Alternatively, the calculating module may calculate the transmitting power $P_{RACH}$ of the uplink random access signal according to the following formula:

$$P_{RACH} = \min(P_{max}, P_0 + PL), \text{ or } P_{RACH} = \min(P_{max}, P_0 + PL + \Delta\beta),$$

where $P_{max}$ represents a maximum transmitting power of the second wireless node, $P_0$ represents a target receiving power, $\Delta\beta$ represents a compensation adjustment amount, PL represents a path loss, and $P_{RACH}$ represents a transmitting power of an uplink random access signal.

Alternatively, the operation that the first power module obtains the receiving power of the first signal/channel may include the following actions.

High-level filtering is performed on the obtained receiving power of the first signal/channel; and the filtered receiving power is obtained.

Alternatively, the operation that the first power module obtains the transmitting power of the first signal/channel may further include the following actions. Access compensation adjustment amount information from the first wireless node is received; and the access compensation adjustment amount information is used to select the first wireless node by the second wireless node.

Alternatively, the operation of the first power module that the second wireless node selects the first wireless node may include the following action.

The second wireless node estimates a receiving power of a wideband signal based on the receiving power and the access compensation adjustment amount information from the first wireless node, and selects the first wireless node.

Alternatively, the device may further include a third receiving module and a determining module.

The third receiving module is configured to receive information on the number of the first wireless nodes from the first wireless node.

The determining module is configured to determine a transmitting power of an uplink random access signal based on the information on the number of the first wireless nodes.

The embodiments of the disclosure further provide a computer readable storage medium having stored thereon computer-executable instructions to implement the method for open-loop power control according to any one of the above items.

Compared with the related art, the disclosure has the following beneficial effects.

It can ensure that an appropriate transmitting power is used to send an uplink random access request in a user-centric access scenario, thereby resisting an effect of a path loss and preventing interference between uplink users.

Other aspects can be understood after the accompanying drawings and detailed descriptions are read and understood.

BRIEF DESCRIPTION OF DRAWINGS

The accompanying drawings described here are used for providing further understanding of the disclosure, and constitute a part of the disclosure. Exemplary embodiments of the disclosure and description thereof are used for illustrating the disclosure and not intended to form an improper limit to the disclosure. In the accompanying drawings:

FIG. 14 is an information pattern of an ID of a synchronization signal/channel and a transmitting power of the synchronization signal/channel according to an embodiment of the disclosure; and FIG. 15 is an information pattern of the ID of the synchronization signal/channel and a transmitting power of a discovery reference signal according to an embodiment of the disclosure.

DETAILED DESCRIPTION

The disclosure is described below with reference to the accompanying drawings and the embodiments in detail. It is to be noted that the embodiments in the disclosure and the features in the embodiments can be combined under the condition of no conflict.

For making the object, the technical solution and the beneficial effects of the disclosure more clear, the embodiments of the disclosure are described below in combination with the accompanying drawings. It is to be noted that the embodiments in the disclosure and the features in the embodiments can be combined under the condition of no conflict.

Figure 1:
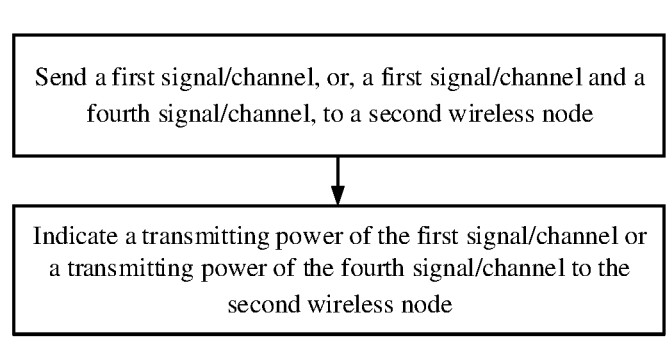
FIG. 1 is a flowchart of a method for open-loop power control in an embodiment of the disclosure.

As illustrated in FIG. 1, a method for open-loop power control is provided, which is applied to a first wireless node. The method includes the following operations.

A first signal/channel is sent to a second wireless node; a transmitting power of the first signal/channel is indicated to the second wireless node; or a first signal/channel and a fourth signal/channel are sent to a second wireless node; a transmitting power of the fourth signal/channel is indicated to the second wireless node;

the transmitting power is used to calculate a downlink path loss and determine a transmitting power of an uplink random access signal by the second wireless node.

Specifically, the operation that the transmitting power of the first signal/channel is indicated to the second wireless node includes at least one of the following actions.

The transmitting power of the first signal/channel is carried in a second signal/channel or a third signal/channel and is sent to the second wireless node;

the first signal/channel is configure to indicate an acquisition mode of the transmitting power of the first signal/channel; or a mapping relationship is provided between the transmitting power of the first signal/channel and an ID of the first signal/channel.

Specifically, the operation that the transmitting power of the fourth signal/channel is indicated to the second wireless node includes at least one of the following actions.

The transmitting power of the fourth signal/channel is carried in the second signal/channel or the third signal/channel and is sent to the second wireless node; or the first signal/channel is configured to indicate an acquisition mode of the transmitting power of the fourth signal/channel.

The first signal/channel includes a synchronization signal or a synchronization channel.

The fourth signal/channel includes a Cell-specific Reference Signal (CRS) or a Channel State Information Reference Signal (CSI-RS).

The second signal/channel includes a Physical Broadcast Channel (PBCH) or information on a payload of the first signal.

The third signal/channel includes an access configuration set.

The first wireless node (a base station) sends the synchronization signal/channel. A transmitting power of the synchronization signal/channel is carried and sent in the PBCH; a transmitting power of the synchronization signal/channel is carried and sent in the access configuration set; the synchronization signal/channel is configured to indicate an acquisition mode of a transmitting power of the synchronization signal/channel; or a mapping relationship is provided between a transmitting power of the synchronization signal/channel and an ID of the synchronization signal/channel.

Or, the first wireless node (a base station) sends the synchronization signal/channel and the CRS. A transmitting power of the CRS is carried and sent in the PBCH set; a transmitting power of the CRS is carried and sent in the access configuration set; or the synchronization signal/channel is configured to indicate an acquisition mode of a transmitting power of the CRS.

The second signal/channel or the third signal/channel includes open-loop power control parameters. The open-loop power control parameters are used for adjusting on an uplink power of the second wireless node (UE), and may include at least one of: maximum transmitting power information, target receiving power information, deviation information on power demands of different types of preamble sequences, accessing times information, information on a step size of incremental power, or compensation adjustment amount information, or the like.

A transmission period and/or a frequency of the second signal/channel is the same as a transmission period and/or a frequency of the first signal/channel Or, there is a multiple relationship between a transmission period and/or a frequency of the second signal/channel and a transmission period and/or a frequency of the first signal/channel.

A time domain resource and/or a frequency domain resource occupied for sending the second signal/channel is located on a fixed physical resource. Or, there is a location correspondence between a location of a time domain resource and/or a location of a frequency domain resource occupied for sending the second signal/channel and a location of a time domain and/or a location of a frequency domain resource occupied for sending the first signal/channel.

The third signal/channel includes at least one access configuration message. The access configuration message carries a transmitting power for sending the first signal/channel or a transmitting power for sending the fourth signal/channel by the first wireless node using the access configuration message.

The third signal and the first signal/channel are sent by different first wireless nodes. The different first wireless nodes may be first wireless nodes in different systems. The systems may be GSM, LTE system, UMTS or new RAT system.

The operation that the first signal/channel is configured to indicate the acquisition mode of the transmitting power of the first signal/channel includes the following action.

The first signal/channel is configured to indicate that the transmitting power used to send the first signal/channel by the first wireless node is carried in the second signal/channel or the third signal/channel.

The operation that the first signal/channel is configured to indicate the acquisition mode of the transmitting power of the fourth signal/channel includes the following action.

The first signal/channel is configured to indicate that a transmitting power used to send the fourth signal/channel by the first wireless node is carried in the second signal/channel or the third signal/channel.

The first signal/channel is used for synchronization and/or cell discovery and is sent by occupying a part of a downlink bandwidth; and the fourth signal/channel is sent on all of the downlink bandwidth discretely or continuously.

The open-loop power control parameters include at least one of: maximum transmitting power information, target receiving power information, deviation information on power demands of different types of preamble sequences, accessing times information, information on a step size of incremental power, or compensation adjustment amount information.

The compensation adjustment amount information is used for compensating a path loss or an uplink transmitting power.

A beam direction for sending the fourth signal/channel is the same as a beam direction for sending the second signal/channel.

The second signal/channel or the third signal/channel further includes: access compensation amount information and/or information on the number of the first wireless nodes.

Figure 2:
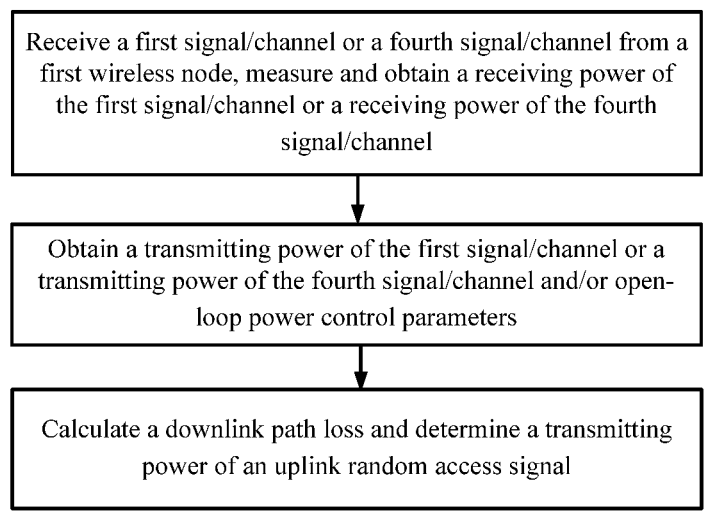
FIG. 2 is a flowchart of another method for open-loop power control in an embodiment of the disclosure.

As illustrated in FIG. 2, the embodiments of the disclosure further provide a method for open-loop power control, which is applied to a second wireless node. The method includes the following operations.

A first signal/channel from a first wireless node is received, a receiving power of the first signal/channel is obtained, and a transmitting power and/or open-loop power control parameters of the first signal/channel is obtained; or a fourth signal/channel from the first wireless node is received, a receiving power of the fourth signal/channel is measured and obtained, and a transmitting power of the fourth signal/channel and/or the open-loop power control parameters are/is obtained; and a downlink path loss is calculated and a transmitting power of an uplink random access signal is determined.

The operation that the transmitting power of the first signal/channel or the transmitting power of the fourth signal/channel from the first wireless node, and/or the open-loop power control parameters, are/is received includes the following actions.

The transmitting power of the first signal/channel or the transmitting power of the fourth signal/channel from the first wireless node is obtained from the second signal/channel or a third signal/channel; or the transmitting power of the first signal/channel from the first wireless node is obtained according to a mapping relationship between the transmitting power of the first signal/channel and an ID of the first signal/channel; and/or the open-loop power control parameters are obtained from the second signal/channel or the third signal/channel.

A receiving period and/or a frequency of the second signal/channel are/is the same as a receiving period and/or a frequency of the first signal/channel, or there is a multiple relationship between a receiving period and/or a frequency of the second signal/channel and a receiving period and/or a frequency of the first signal/channel.

A time domain resource and/or a frequency domain resource occupied for receiving the second signal/channel are/is located on a fixed physical resource, or there is a location correspondence between a location of a time domain resource and/or a location of a frequency domain resource occupied for receiving the second signal/channel and a location of a time domain resource and/or a location of a frequency domain resource occupied for receiving the first signal/channel.

The open-loop power control parameters include at least one of: maximum transmitting power information, target receiving power information, deviation information on power demands of different types of preamble sequences, accessing times information, information on a step size of incremental power, or compensation amount information.

The compensation adjustment amount information is used for compensating a path loss or an uplink transmitting power.

The operation that the downlink path loss is calculated includes the following action.

The downlink path loss is calculated according to a receiving power of the first signal/channel or the fourth signal/channel and the transmitting power of the first signal/channel or the fourth signal/channel and/or the open-loop power control parameters.

The downlink path loss is calculated according to the following formula:

$$PL=P1_{Tx}-P1_{RX}, PL=P2_{Tx}-P2_{RX}, PL=P1_{Tx}-P1_{RX}+\Delta\beta, \text{ or } PL=P2_{Tx}-P2_{RX}+\Delta\beta,$$

where PL represents a path loss, $P1_{Tx}$ represents a transmitting power used to send the first signal/channel by the first wireless node and received by the second wireless node, $P1_{RX}$ represents a receiving power of the first signal channel, which is obtained by the second wireless node, $P2_{Tx}$ represents a transmitting power used to send the fourth signal/channel by the first wireless node and received by the second wireless node, $P2_{RX}$ represents a receiving power of the fourth signal/channel, which is obtained by the second wireless node, and $\Delta\beta$ represents a compensation adjustment amount.

The operation that the transmitting power of the uplink random access signal is determined includes the following action. A transmitting power of the uplink random access signal is calculated and determined according to the downlink path loss and/or the open-loop power control parameters.

The transmitting power of the uplink random access signal is calculated according to the following formula:

$$P_{RACH}=\min(P_{max},P_0+PL), \text{ or } P_{RACH}=\min(P_{max},P_0+PL+\Delta\beta),$$

where $P_{max}$ represents a maximum transmitting power of the second wireless node, $P_0$ represents a target receiving power, $\Delta\beta$ represents a compensation adjustment amount, PL represents a path loss, and $P_{RACH}$ represents a transmitting power of an uplink random access signal.

The operation that the receiving power of the first signal/channel is obtained includes the following actions.

High-level filtering is performed on the obtained receiving power of the first signal/channel; and the filtered receiving power is obtained.

In the high-level filtering, smoothing may be performed according to the following algorithm: $F_n=(1-a)\cdot F_{n-1}+a\cdot M_n$, where $F_n$ represents a result of this smoothing, $F_{n-1}$ represents a result of the last smoothing, $M_n$ represents a measurement result reported by a physical layer this time, and a represents a smoothing factor. In the first smoothing, $F_0=M_1$.

The operation that the transmitting power of the first signal/channel is obtained further includes the following actions. The access compensation adjustment amount information from the first wireless node is received; and the access compensation adjustment amount information is used to select the first wireless node by the second wireless node.

The operation that the second wireless node selects the first wireless node includes the following action.

The second wireless node estimates a receiving power of a wideband signal based on the receiving power and the access compensation adjustment amount from the first wireless node, and selects the first wireless node.

Before the downlink path loss is calculated and the transmitting power of the uplink random access signal is determined, the method further includes the following operations.

Information on the number of the first wireless nodes from the first wireless node is received; and the transmitting power of the uplink random access signal is determined based on the information on the number of the first wireless nodes.

In the embodiments of the disclosure, the path loss is estimated and RSRP is measured by using a narrowband signal N-DRS, together with necessary open-loop power control parameters, so that an uplink transmitting power is determined. In the LTE system, the path loss is estimated and the RSRP is measured by using a wideband signal CRS. An interference problem of the CRS is always a serious problem in an LTE network. Therefore, discussion and research are conducted in the issue FeICIC at the stage Rel-11, the CRS is replaced with the narrowband signal N-DRS to measure the RSRP, thereby reducing the interference and improving forward compatibility of system design. Moreover, to estimate the path loss, it is required to learn a transmitting power of a signal. In the LTE system, information on a transmitting power of the CRS is transmitted through an SIB message. The SIB message is carried in a traffic channel, so it is required to schedule/allocate resources for a terminal to transmit the SIB message, which increases the time for obtaining information. When the path loss is estimated by using the narrowband signal, the transmitting power of the N-DRS may be obtained from a payload of the N-DRS, from a base station of the LTE system as assistance, or from a broadcast signal/channel Whether the information on the transmitting power of the N-DRS is carried in the payload or the broadcast signal/channel, the information is carried on a physical channel. Compared with the SIB message, the used resources and code rate are fixed, so that the terminal obtains the information on the transmitting power of the N-DRS quickly for open-loop power control, and an uplink access request is initiated quickly.

Figure 3:
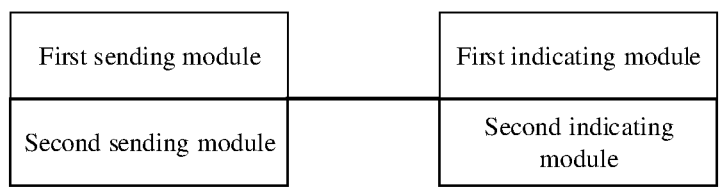
FIG. 3 is a schematic structural diagram of a device for open-loop power control in an embodiment of the disclosure.

As illustrated in FIG. 3, the embodiments of the disclosure further provide a device for open-loop power control, which is provided on a first wireless node. The device includes: a first sending module and a first indicating module; or, a second indicating module and a second indicating module.

The first sending module is configured to send a first signal/channel to a second wireless node.

The first indicating module is configured to indicate a transmitting power of the first signal/channel to the second wireless node.

The second sending module is configured to send a first signal/channel and a fourth signal/channel to a second wireless node.

The second indicating module is configured to indicate a transmitting power of the fourth signal/channel to the second wireless node.

The transmitting power is used to calculate a downlink path loss and determine a transmitting power of an uplink random access signal by the second wireless node.

The operation that the first indicating module indicates the transmitting power of the first signal/channel to the second wireless node includes at least one of the following actions.

The transmitting power of the first signal/channel is carried in a second signal/channel or a third signal/channel and is sent to the second wireless node;

the first signal/channel is configured to indicate an acquisition mode of the transmitting power of the first signal/channel; or a mapping relationship is provided between the transmitting power of the first signal/channel and an ID of the first signal/channel.

The operation that the second indicating module indicates the transmitting power of the fourth signal/channel to the second wireless node includes at least one of the following actions.

The transmitting power of the fourth signal/channel is carried in the second signal/channel or the third signal/channel and is sent to the second wireless node; or the first signal/channel is configured to indicate an acquisition mode of the transmitting power of the fourth signal/channel.

The operation of the first indicating module that the first signal/channel of the first indicating module indicates the acquisition mode of the transmitting power of the first signal/channel includes the following action.

The first signal/channel is configured to indicate that the transmitting power used to send the first signal/channel by the first wireless node is carried in the second signal/channel or the third signal/channel.

The operation of the second indicating module that the first signal/channel indicates the acquisition mode of the transmitting power of the fourth signal/channel includes the following action.

The first signal/channel is configured to indicate that the transmitting power used to send the fourth signal/channel by the first wireless node is carried in the second signal/channel or the third signal/channel.

The first sending module is further configured to send the first signal/channel for synchronization and/or cell discovery by occupying a part of a downlink bandwidth.

The second sending module is further configured to send the fourth signal/channel on all of the downlink bandwidth discretely or continuously.

A beam direction used to send the fourth signal/channel by the second sending module is the same as a beam direction for sending the second signal/channel.

Figure 4:
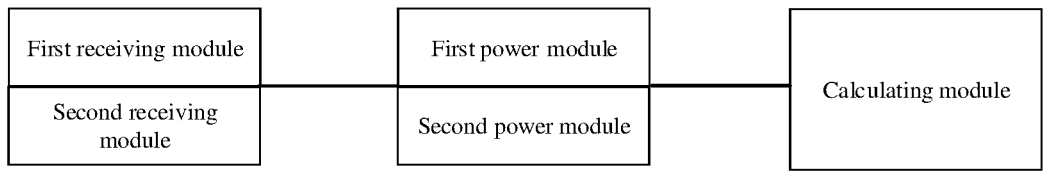
FIG. 4 is a schematic structural diagram of another device for open-loop power control in an embodiment of the disclosure.

As illustrated in FIG. 4, the embodiments of the disclosure further provide a device for open-loop power control, which is provided on a second wireless node. The device includes: a first receiving module, a first power module and a calculating module; or, a second receiving module, a second power module and a calculating module.

The first receiving module is configured to receive a first signal/channel from a first wireless node, measure and obtain a receiving power of the first signal/channel.

The first power module is configured to obtain a transmitting power of the first signal/channel and/or open-loop power control parameters.

The second receiving module is configured to receive a fourth signal/channel from the first wireless node, measure and obtain a receiving power of the fourth signal/channel.

The second power module is configured to obtain a transmitting power of the fourth signal/channel and/or open-loop power control parameters.

The calculating module is configured to calculate a downlink path loss and determine a transmitting power of an uplink random access signal.

The operation that the first power module obtains the transmitting power of the first signal/channel and/or the open-loop power control parameters, or the second power module obtains the transmitting power of the fourth signal/channel and/or the open-loop power control parameters includes the following actions.

The transmitting power of the first signal/channel or the transmitting power of the fourth signal/channel from the first wireless node is obtained from the second signal/channel or the third signal/channel; or the transmitting power of the first signal/channel from the first wireless node is obtained according to a mapping relationship between the transmitting power of the first signal/channel and an ID of the first signal/channel; and/or the open-loop power control parameters are obtained from the second signal/channel or the third signal/channel.

The operation that the calculating module calculates the downlink path loss includes the following action.

The downlink path loss is calculated according to the receiving power of the first signal/channel or the fourth signal/channel and the transmitting power of the first signal/channel or the fourth signal/channel and/or the open-loop power control parameters.

The calculating module calculates the downlink path loss according to the following formula:

$$PL=P1_{Tx}-P1_{RX},\ PL=P2_{Tx}-P2_{RX},\ PL=P1_{Tx}-P1_{RX}+\Delta\beta,\ \text{or}\ PL=P2_{Tx}-P2_{RX}+\Delta\beta,$$

where PL represents a path loss, $P1_{Tx}$ represents a transmitting power used to send the first signal/channel by the first wireless node and received by the second wireless node, $P1_{RX}$ represents a receiving power of the first signal/channel, which is obtained by the second wireless node, $P2_{Tx}$ represents a transmitting power used to send the fourth signal/channel by the first wireless node and received by the second wireless node, $P2_{RX}$ represents a receiving power of the fourth signal/channel, which is obtained by the second wireless node, and $\Delta\beta$ represents a compensation adjustment amount.

The operation that the calculating module determines the transmitting power of the uplink random access signal includes the following action. The transmitting power of the uplink random access signal is calculated and determined according to the downlink path loss and/or the open-loop power control parameters.

The calculating module calculates the transmitting power of the uplink random access signal according to the following formula:

$$P_{RACH}=\min(P_{max},P_0+PL),\ \text{or}\ P_{RACH}=\min(P_{max},P_0+PL+\Delta\beta),$$

where $P_{max}$ represents a maximum transmitting power of the second wireless node, $P_0$ represents a target receiving power, $\Delta\beta$ represents a compensation adjustment amount, PL represents a path loss, and $P_{RACH}$ represents a transmitting power of an uplink random access signal.

The operation that the first power module obtains the receiving power of the first signal/channel includes the following actions.

High-level filtering is performed on the obtained receiving power of the first signal/channel; and the filtered receiving power is obtained.

The operation that the first power module obtains the transmitting power of the first signal/channel further includes the following actions. Access compensation adjustment amount information from the first wireless node is received; and the access compensation adjustment amount information is used to select the first wireless node by the second wireless node.

The operation of the first power module that the second wireless node selects the first wireless node includes the following action.

The second wireless node estimates a receiving power of a wideband signal based on the receiving power and the access compensation adjustment amount information from the first wireless node, and selects the first wireless node.

The device may further include a third receiving module and a determining module.

The third receiving module is configured to receive information on the number of the first wireless nodes from the first wireless node.

The determining module is configured to determine a transmitting power of an uplink random access signal based on the information on the number of the first wireless nodes.

Embodiment 1

Figure 5:
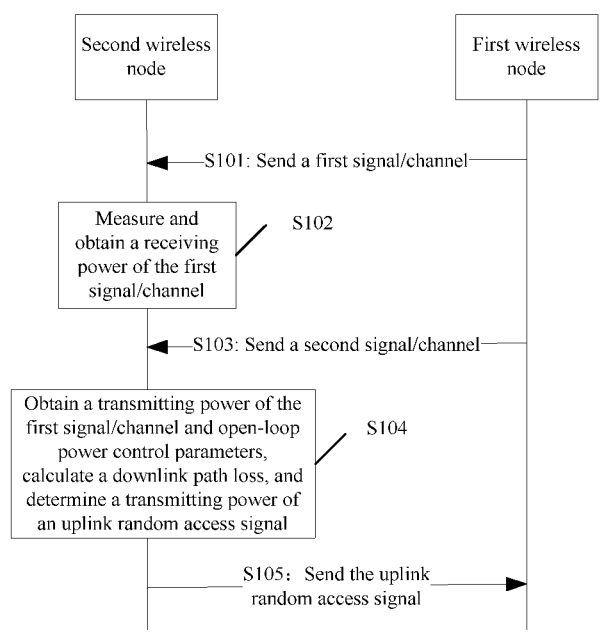
FIG. 5 is a flowchart of the method for open-loop power control according to embodiment 1 of the disclosure.

In the present embodiment, a method for open-loop power control is provided. As illustrated in FIG. 5, the flow includes the following operations.

At block S101, a base station sends a synchronization signal/channel.

Preferably, the synchronization signal/channel may be a narrowband signal/channel and sent by occupying a part of a downlink bandwidth.

At block S102, a terminal measures and obtains a receiving power of the synchronization signal/channel.

Preferably, the terminal may detect the synchronization signal/channel to establish downlink synchronization with the base station, and acquire the receiving power of the synchronization signal/channel.

Preferably, the synchronization signal/channel may also be used to perform channel estimation. A result of the channel estimation may be used to demodulate a payload of the synchronization signal.

At block S103, the base station sends the payload of the synchronization signal, and the payload of the synchronization signal carries a transmitting power of the synchronization signal/channel and the open-loop power control parameters.

Preferably, the payload of the synchronization signal may be understood as a part of the synchronization signal, that is, the synchronization signal includes two parts: a synchronization sequence and the payload of the synchronization signal.

Preferably, the payload of the synchronization signal may be sent along with the synchronization signal/channel, that is, their transmission periods/frequencies are same, and one synchronization signal payload is sent while one synchronization signal/channel is sent.

Preferably, a time domain resource and/or a frequency domain resource occupied for sending a broadcast signal/channel may have a fixed location.

At block S104, the terminal receives and obtains the transmitting power of the synchronization signal/channel and the open-loop power control parameters, calculates a downlink path loss, and determines a transmitting power of an uplink random access signal.

Preferably, the open-loop power control parameters may include: maximum transmitting power information, target receiving power information, and compensation adjustment amount information.

Preferably, the downlink path loss may be calculated according to the following formula: $PL=P1_{Tx}-P1_{RX}$, where $P1_{Tx}$ represents a transmitting power used to send the synchronization signal/channel by the base station, and $P1_{Rx}$ represents a receiving power of the synchronization signal/channel, which is obtained by the terminal.

Preferably, the transmitting power of the uplink random access signal may be determined according to the following formula: $P_{RACH}=\min(P_{max}, P_0+PL+\Delta\beta)$, where $P_{max}$ is a maximum transmitting power of the terminal, $P_0$ is a target receiving power, $\Delta\beta$ is a compensation adjustment amount which is one of the open-loop power control parameters, and is used for compensating the uplink transmitting power, PL is the path loss, and $P_{RACH}$ is the transmitting power of the uplink random access signal.

At block S105, the terminal sends the uplink random access signal.

Preferably, the terminal may send the uplink random access signal by using $P_{RACH}$.

Embodiment 2

Figure 6:
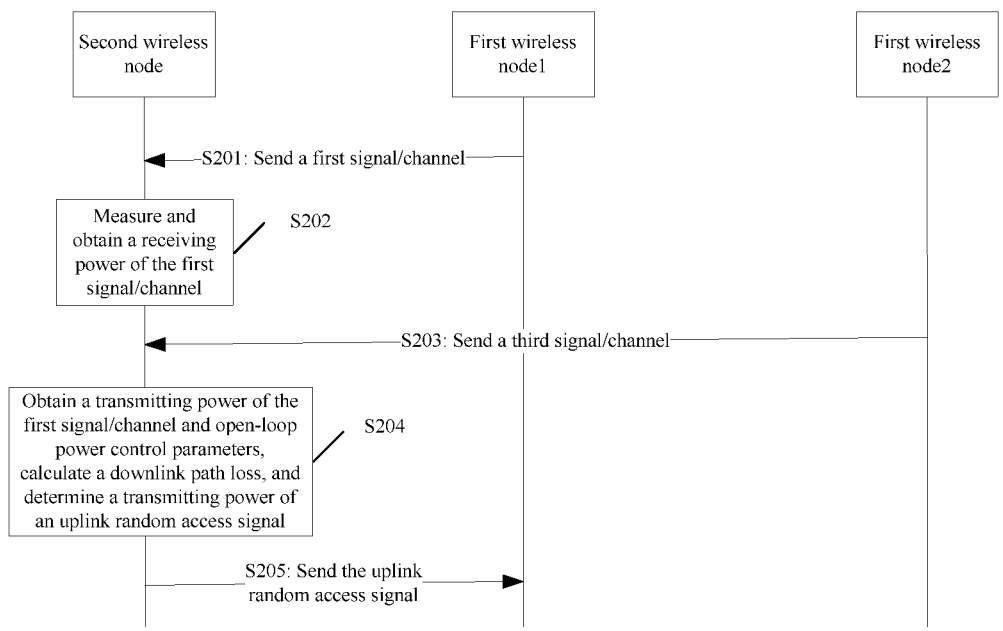
FIG. 6 is a flowchart of the method for open-loop power control according to embodiment 2 of the disclosure.

In the present embodiment, a method for open-loop power control is provided. As illustrated in FIG. 6, the flow includes the following operations.

At block S201, a base station 1 sends a synchronization signal/channel.

Preferably, the base station 1 may be a base station using new RAT system.

Preferably, the synchronization signal/channel may be a narrowband signal/channel and sent by occupying only a part of a downlink bandwidth.

At block S202, a terminal measures and obtains a receiving power of the synchronization signal/channel.

Preferably, the terminal may detect the synchronization signal/channel to establish downlink synchronization with the base station 1, and may obtain the receiving power of the synchronization signal/channel.

At block S203, a base station 2 sends an access configuration set, where the access configuration set carries a transmitting power of the synchronization signal/channel and open-loop power control parameters.

Preferably, the access configuration set may include multiple access configuration messages. Different IDs of synchronization signal/channels correspond to different access configuration messages.

Preferably, the base station 2 may be a base station using an LTE system.

At block S204, the terminal receives and obtains a transmitting power of the synchronization signal/channel and the open-loop power control parameters, calculates a downlink path loss, and determines a transmitting power of an uplink random access signal.

Preferably, the open-loop power control parameters may include: maximum transmitting power information, target receiving power information, and compensation adjustment amount information.

Preferably, the downlink path loss may be calculated according to the following formula: $PL=P1_{Tx}-P1_{RX}+\Delta\beta$, where $P1_{Tx}$ represents a transmitting power used to send the synchronization signal/channel by the base station, $P1_{RX}$ represents a receiving power of the synchronization signal/channel, which is obtained by the terminal, and $\Delta\beta$ represents a compensation adjustment amount which is one of the open-loop power control parameters. The base station estimates a deviation of a signal intensity of a frequency domain location between the synchronization signal/channel and the random access signal by using channel reciprocity, determines and sends the compensation adjustment amount $\Delta\beta$ to compensate the path loss.

Preferably, the transmitting power of the uplink random access signal may be determined according to the following formula: $P_{RACH}=\min(P_{max}, P_0+PL)$, where $P_{max}$ represents a maximum transmitting power of the terminal, $P_0$ represents a target receiving power, PL represents a path loss, and $P_{RACH}$ represents a transmitting power of an uplink random access signal.

At block S205, the terminal sends the uplink random access signal.

Preferably, the terminal may send the uplink random access signal by using $P_{RACH}$.

Embodiment 3

Figure 7:
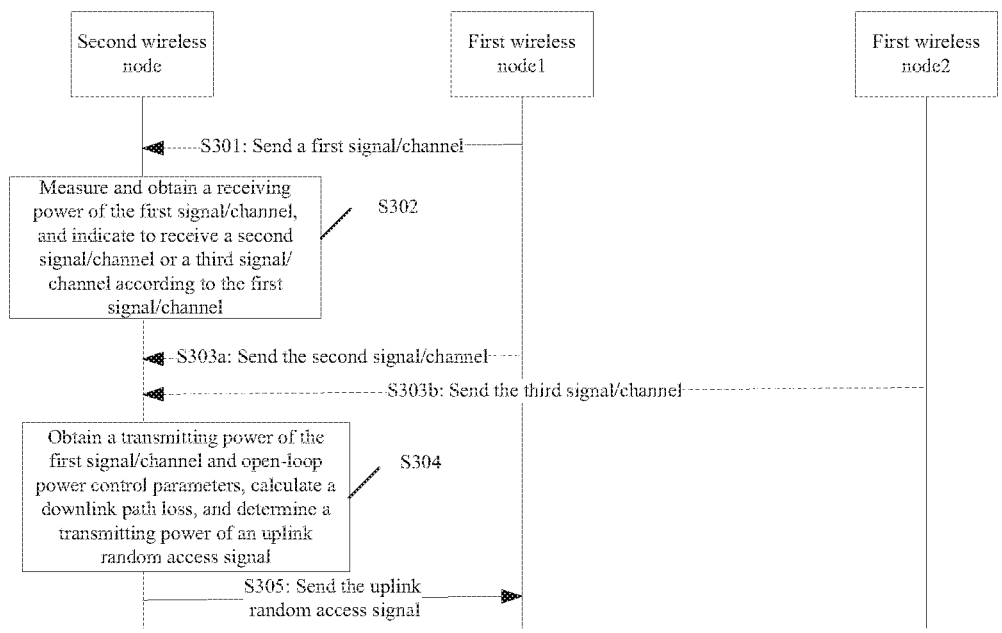
FIG. 7 is a flowchart of the method for open-loop power control according to embodiment 3 of the disclosure.

In the present embodiment, a method for open-loop power control is provided. As illustrated in FIG. 7, the flow includes the following operations.

At block S301, a base station 1 sends a synchronization signal/channel.

Preferably, the base station 1 may be a base station using new RAT system.

Preferably, the synchronization signal/channel may be a narrowband signal/channel and sent by occupying only a part of a downlink bandwidth.

At block S302, the terminal measures and obtains a receiving power of the synchronization signal/channel, and indicates whether a broadcast signal or an access configuration set is received according to the synchronization signal/channel.

Preferably, the terminal may detect the synchronization signal/channel to establish downlink synchronization with the base station 1, and may acquire the receiving power of the synchronization signal/channel.

Preferably, indication may be given by a certain bit in a sequence of the synchronization signal/channel, for example, the last bit in the sequence of the synchronization signal/channel. When the bit is 0, it is indicated that the terminal is required to receive the broadcast signal/channel from the base station 1, and block S303a is performed. When the bit is 1, it is indicated that the terminal is required to obtain the access configuration set from a base station 2, and block S303b is performed.

At block S303a, the base station 1 sends a broadcast signal/channel, where the broadcast signal/channel carries a transmitting power of the synchronization signal/channel and open-loop power control parameters.

Preferably, there may be a multiple relationship between a transmission period/frequency of the broadcast signal/channel and a transmission period/frequency of the synchronization signal/channel, and sending multiple synchronization signals/synchronization channels corresponds to sending one broadcast signal/channel.

Preferably, there may be a fixed location relationship between a location of a time domain resource and/or a location of a frequency domain resource occupied for sending the broadcast signal/channel and a location of a time domain resource and/or a location of a frequency domain resource occupied for sending the synchronization signal/channel. For example, when the synchronization signal/channel is sent on the nth sub-frame, the broadcast signal/channel is sent on the (n+2)-th sub-frame.

At block S303b, the base station 2 sends an access configuration set, where the access configuration set carries the transmitting power of the synchronization signal/channel and the open-loop power control parameters.

Preferably, the access configuration set may include multiple access configuration messages. Different IDs of synchronization signal/channels correspond to different access configuration messages.

Preferably, the base station 2 may be a base station using new RAT system.

At block S304, the terminal receives and obtains the transmitting power of the synchronization signal/channel and the open-loop power control parameters, calculates a downlink path loss, and determines a transmitting power of an uplink random access signal.

Preferably, the open-loop power control parameters may include: maximum transmitting power information, target receiving power information, and compensation adjustment amount information.

Preferably, the downlink path loss may be calculated according to the following formula: $PL=P1_{Tx}-P1_{RX}+\Delta\beta$, where $P1_{Tx}$ represents a transmitting power used to send the synchronization signal/channel by the base station, $P1_{RX}$ represents the obtained receiving power of the synchronization signal/channel, and $\Delta\beta$ represents the compensation adjustment amount which is one of the open-loop power control parameters, and is used for compensating the path loss.

Preferably, the transmitting power of the uplink random access signal may be determined according to the following formula: $P_{RACH}=\min(P_{max}, P_0+PL)$, where $P_{max}$ represents a maximum transmitting power of the terminal, $P_0$ represents a target receiving power, the PL represents a path loss, and $P_{RACH}$ represents a transmitting power of an uplink random access signal.

At block S305, the terminal sends the uplink random access signal.

Preferably, the terminal may send the uplink random access signal by using $P_{RACH}$.

Embodiment 4

Figure 8:
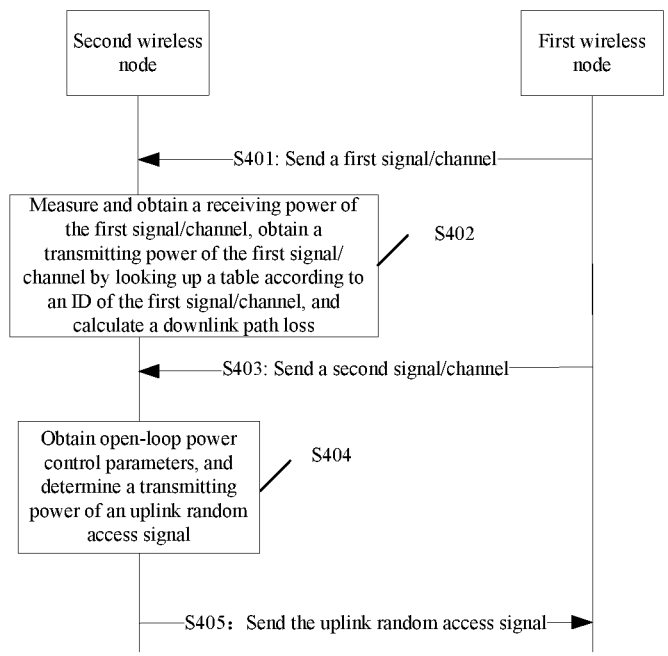
FIG. 8 is a flowchart of the method for open-loop power control according to embodiment 4 of the disclosure.

In the present embodiment, a method for open-loop power control is provided. As illustrated in FIG. 8, the flow includes the following operations.

At block S401, a base station sends a synchronization signal/channel.

Preferably, the synchronization signal/channel may be a narrowband signal/channel and sent by occupying a part of a downlink bandwidth.

At block S402, the terminal measures and obtains the receiving power of the synchronization signal/channel, obtains a transmitting power of the synchronization signal/channel by looking up a table according to an ID of the synchronization signal/channel, and calculates a downlink path loss.

Preferably, the terminal may detect the synchronization signal/channel to establish downlink synchronization with the base station, and may obtain the receiving power of the synchronization signal/channel.

Preferably, information on the transmitting power of the synchronization signal/channel may be obtained by looking up the table according to the ID of the synchronization signal/channel. As illustrated in FIG. 14, different IDs of synchronization signal/channels correspond to different transmitting power levels. For example, a transmitting power corresponding to the ID1 of the synchronization signal is 30 dBm, a transmitting power corresponding to the ID2 of the synchronization signal is 27 dBm, and a transmitting power corresponding to the ID3 of the synchronization signal is 24 dBm.

Preferably, the downlink path loss may be calculated according to the formula: $PL=P1_{Tx}-P1_{RX}$, where $P1_{Tx}$ represents a transmitting power used to send the synchronization signal/channel by the base station, and $P1_{RX}$ represents a receiving power of the synchronization signal/channel, which is obtained by the terminal.

At block S403, the base station sends a broadcast signal/channel carrying open-loop power control parameters.

Preferably, the broadcast signal/channel may be sent along with the synchronization signal/channel, that is, their transmission periods/frequencies are same, and one broadcast signal/channel is sent while one synchronization signal/channel is sent.

Preferably, a time domain resource and/or a frequency domain resource occupied for sending the broadcast signal/channel may have a fixed location.

Preferably, the broadcast signal/channel may also include access compensation adjustment amount information. The base station may estimate a deviation between an RSRP of the narrowband signal and an RSRP of the wideband signal by using the channel reciprocity, calculate and send the access compensation adjustment amount information, thereby compensating inaccurate RRM measurement using the narrowband signal.

At block S404, the terminal receives and obtains the open-loop power control parameters, and determines a transmitting power of an uplink random access signal.

Preferably, the open-loop power control parameters may include maximum transmitting power information, target receiving power information, information on a deviation between power demands of different types of preamble sequences, information on accessing times, information on a step size of incremented power, and compensation adjustment amount information.

Preferably, the terminal may be used for base station selection based on the receiving power of the synchronization signal/channel and the access compensation adjustment amount information.

At block S405, the terminal sends the uplink random access signal.

Embodiment 5

Figure 9:
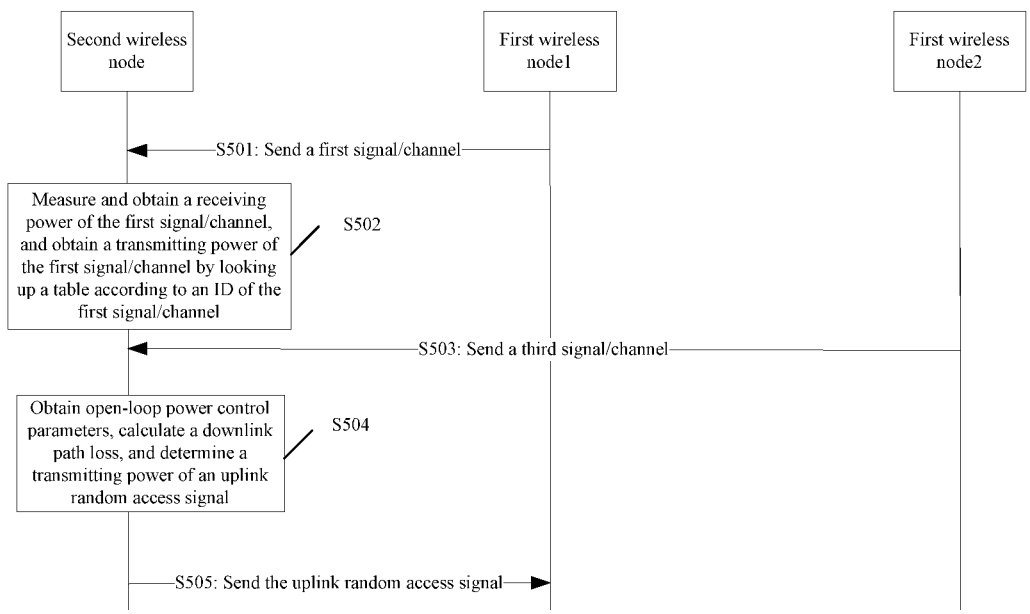
FIG. 9 is a flowchart of the method for open-loop power control according to embodiment 5 of the disclosure.

In the present embodiment, a method for open-loop power control is provided. As illustrated in FIG. 9, the flow includes the following operations.

At block S501, a base station 1 sends an N-DRS.

Preferably, the base station 1 may be a base station using new RAT system.

Preferably, the N-DRS may be a narrowband signal/channel and sent by occupying a part of a downlink bandwidth.

At block S502, the terminal measures and obtains a receiving power of the N-DRS, and obtains a transmitting power of the N-DRS by looking up a table according to an ID of the N-DRS.

Preferably, the terminal may detect the N-DRS to establish downlink synchronization with the base station 1, and may obtain the receiving power of the N-DRS.

Preferably, information on the transmitting power of the N-DRS is obtained by looking up a table according to the ID of the N-DRS. As illustrated in FIG. 14, different IDs of the N-DRSs correspond to different transmitting power levels. For example, a transmitting power corresponding to the ID1 of the N-DRS is 21 dBm, a transmitting power corresponding to the ID2 of the N-DRS is 21 dBm, a transmitting power corresponding to the ID3 of the N-DRS is 24 dBm, a transmitting power corresponding to the ID4 of the N-DRS is 24 dBm, and a transmitting power corresponding to the ID5 of the N-DRS is 27 dBm.

At block S503, a base station 2 sends an access configuration set carrying open-loop power control parameters.

Preferably, the access configuration set may include multiple access configuration messages. Different IDs of the N-DRSs correspond to different access configuration messages.

Preferably, the base station 2 may be a base station using an LTE system.

At block S504, the terminal receives and obtains the open-loop power control parameters, calculates a downlink path loss, and determines a transmitting power of an uplink random access signal.

Preferably, the open-loop power control parameters may include: maximum transmitting power information, target receiving power information, and compensation adjustment amount information.

Preferably, the downlink path loss may be calculated according to the following formula: $PL=P1_{Tx}-P1_{RX}+\Delta\beta$, where $P1_{Tx}$ represents a transmitting power used to send the N-DRS by the base station, $P1_{RX}$ represents a receiving power of the N-DRS, which is obtained by the terminal, and $\Delta\beta$ is a compensation adjustment amount which is one of the open-loop power control parameters, and is used for compensating the path loss.

At block S505, the terminal sends an uplink random access signal.

Embodiment 6

Figure 10:
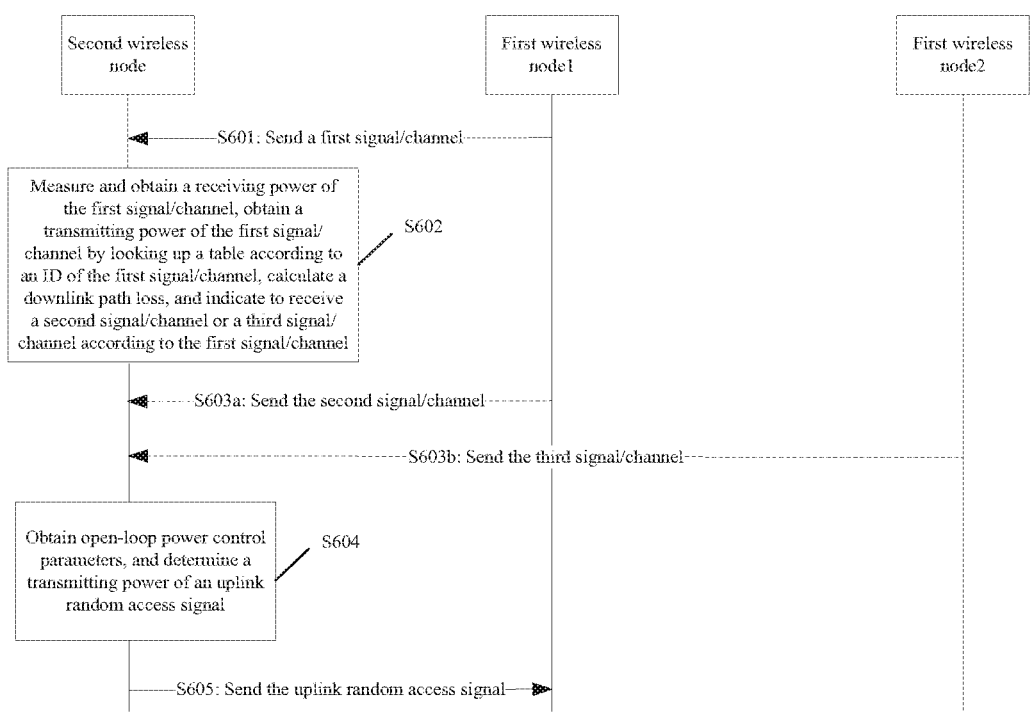
FIG. 10 is a flowchart of the method for open-loop power control according to embodiment 6 of the disclosure.

In the present embodiment, a method for open-loop power control is provided. As illustrated in FIG. 10, the flow includes the following operations.

At block S601, a base station 1 sends a synchronization signal/channel.

Preferably, the base station 1 may be a base station using new RAT system.

Preferably, the synchronization signal/channel may be a narrowband signal/channel and sent by occupying a part of a downlink bandwidth.

At block S602, a terminal measures and obtains a receiving power of the synchronization signal/channel, obtains a transmitting power of the synchronization signal/channel by looking up a table according to an ID of the synchronization signal/channel to, and calculates a downlink path loss. Moreover, the terminal may indicate whether a broadcast signal or an access configuration set is received according to the ID of the synchronization signal/channel.

Preferably, the terminal may detect the synchronization signal/channel to establish downlink synchronization with a base station, and may obtain the receiving power of the synchronization signal/channel.

Preferably, the receiving power of the synchronization signal/channel may be a signal receiving power on which high-layer filtering is performed.

Preferably, information on the transmitting power of a DRS is obtained by looking up a table according to the ID of the synchronization signal/channel. As illustrated in FIG. 15, different IDs of DRSs correspond to different transmitting power levels. For example, a transmitting power corresponding to the ID1 of the DRS is 21 dBm, a transmitting power corresponding to the ID2 of the DRS is 21 dBm, a transmitting power corresponding to the ID3 of the DRS is 24 dBm, and a transmitting power corresponding to the ID4 of the DRS is 27 dBm.

Preferably, whether the broadcast signal or the access configuration set is received may be indicated according to the ID of the synchronization signal/channel. As illustrated in FIG. 15, different IDs of synchronization signal/channels may correspond to different indicator bits. For example, when an indicator bit corresponding to the ID2 of the synchronization signal/channel is 1, it is indicated that the terminal is required to receive a broadcast signal/channel from the base station 1, and block S603a is performed. For example, an indicator bit corresponding to the ID1 of the synchronization signal/channel is 0, it is indicated that the terminal is required to obtain the access configuration set from the base station 2, and block S603b is performed.

At block S603a, the base station 1 sends the broadcast signal/channel carrying the transmitting power of the synchronization signal/channel and open-loop power control parameters.

Preferably, transmission periods/frequencies of the broadcast signal/channel and the synchronization signal/channel may be the same, that is, sending one broadcast signal/channel corresponds to sending one synchronization signal/channel.

Preferably, there may be a fixed location relationship between a location of a time domain resource and/or a location of a frequency domain resource occupied for sending the broadcast signal/channel and a location of a time domain resource and/or a location of a frequency domain resource occupied for sending the synchronization signal/channel. For example, when the synchronization signal/channel is sent on the nth sub-frame, the broadcast signal/channel is sent on the (n+4)-th sub-frame.

At block S603b, the base station 2 sends the access configuration set carrying the open-loop power control parameters.

Preferably, the access configuration set may include multiple access configuration messages. Different IDs of synchronization signal/channels correspond to different access configuration messages.

Preferably, the base station 2 may be a base station using new RAT system.

At block S604, the terminal receives and obtains the transmitting power of the synchronization signal/channel and the open-loop power control parameters, and determines a transmitting power of an uplink random access signal.

At block S605, the terminal sends the uplink random access signal.

Embodiment 7

Figure 11:
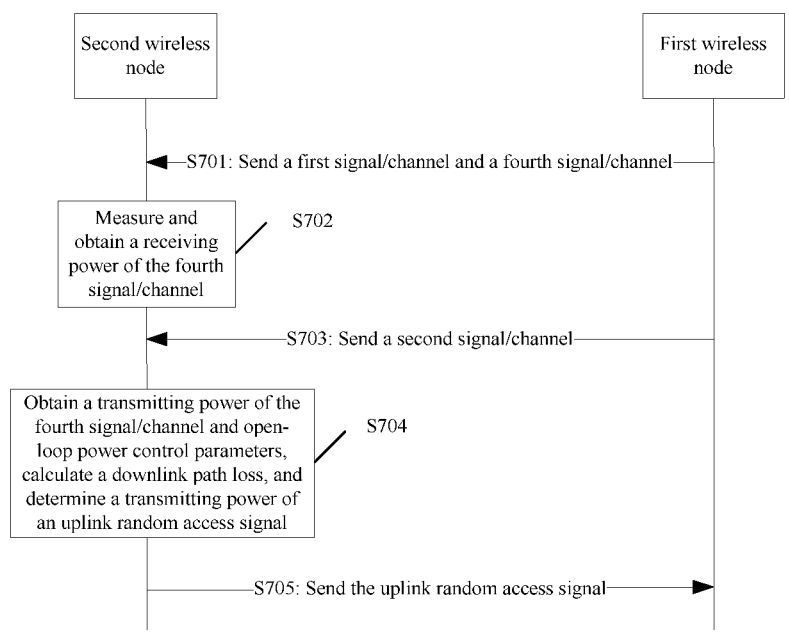
FIG. 11 is a flowchart of the method for open-loop power control according to embodiment 7 of the disclosure.

In the present embodiment, a method for open-loop power control is provided. As illustrated in FIG. 11, the flow includes the following operations.

At block S701, a base station sends a synchronization signal/channel and A Cell-specific Reference Signal (CRS).

Preferably, the synchronization signal/channel may be a narrowband signal/channel and sent by occupying a part of a downlink bandwidth.

Preferably, the CRS may be a wideband signal, and may be discretely or continuously distributed and sent on all of the downlink bandwidth.

At block S702, the terminal measures and obtains a receiving power of the CRS.

Preferably, the terminal may detect the synchronization signal/channel to establish downlink synchronization with the base station.

Preferably, the receiving power of the CRS may be a signal receiving power on which high-layer filtering is performed.

At block S703, the base station sends the broadcast signal/channel carrying a transmitting power of the CRS and open-loop power control parameters.

Preferably, the broadcast signal/channel may be sent along with the synchronization signal/channel, that is, their transmission periods/frequencies are same. One broadcast signal/channel is sent while one synchronization signal/channel is sent.

Preferably, a time domain resource and/or a frequency domain resource occupied for sending the broadcast signal/channel may have a fixed location.

Preferably, a beam direction used to send the broadcast signal/channel by the base station is the same as a beam direction for transmitting the CRS.

At block S704, the terminal receives and obtains the transmitting power of the CRS and the open-loop power control parameters, calculates a downlink path loss, and determines a transmitting power of an uplink random access signal.

At S705, the terminal sends the uplink random access signal.

Embodiment 8

Figure 12:
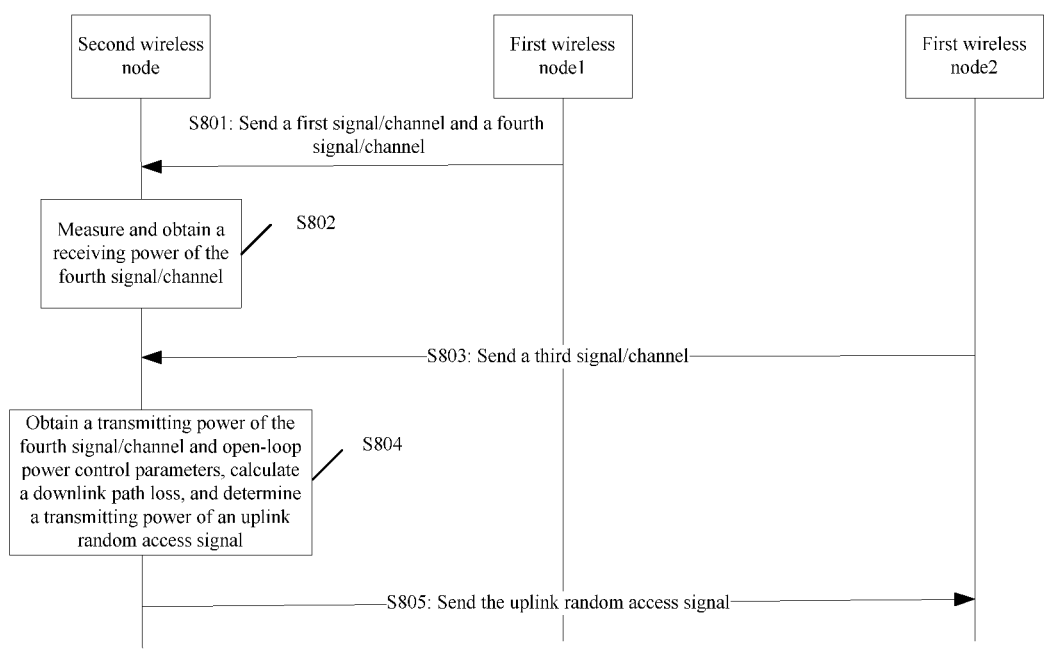
FIG. 12 is a flowchart of the method for open-loop power control according to embodiment 8 of the disclosure.

In the present embodiment, a method for open-loop power control is provided. As illustrated in FIG. 12, the flow includes the following operations.

At block S801, the base station 1 sends an N-DRS and a Channel-state Information Reference Signal (CSI-RS).

Preferably, the base station 1 may be a base station using new RAT system.

Preferably, the N-DRS may be a narrowband signal/channel and sent by occupying a part of a downlink bandwidth.

Preferably, the CSI-RS may be a wideband signal, and may be discretely distributed and sent on all of the downlink bandwidth.

At block S802, the terminal measures and obtains a receiving power of the CSI-RS.

Preferably, the terminal may detect the N-DRS to establish downlink synchronization with the base station 1.

Preferably, the receiving power of the CSI-RS may be a signal receiving power on which high-layer filtering is performed.

At S803, a base station 2 sends an access configuration set carrying a transmitting power of the CSI-RS and open-loop power control parameters.

Preferably, the access configuration set may include multiple access configuration messages. Different IDs of N-DRSs correspond to different access configuration messages.

Preferably, the base station 2 may be a base station using an LTE system.

Preferably, the access configuration set may further include information on the number of the base stations using new RAT system, which may be accessed by the terminal randomly.

At block S804, the terminal receives and obtains the transmitting power of the CSI-RS and the open-loop power control parameters, calculates a downlink path loss, and determines a transmitting power of an uplink random access signal.

Preferably, the terminal may further control the transmitting power of the uplink random access signal according to the information on the number of the base stations using new RAT system, which may be accessed by the terminal randomly. For example, when the number is large, the terminal may reduce a power for sending the uplink random access signal appropriately.

At block S805, the terminal sends the uplink random access signal.

Embodiment 9

Figure 13:
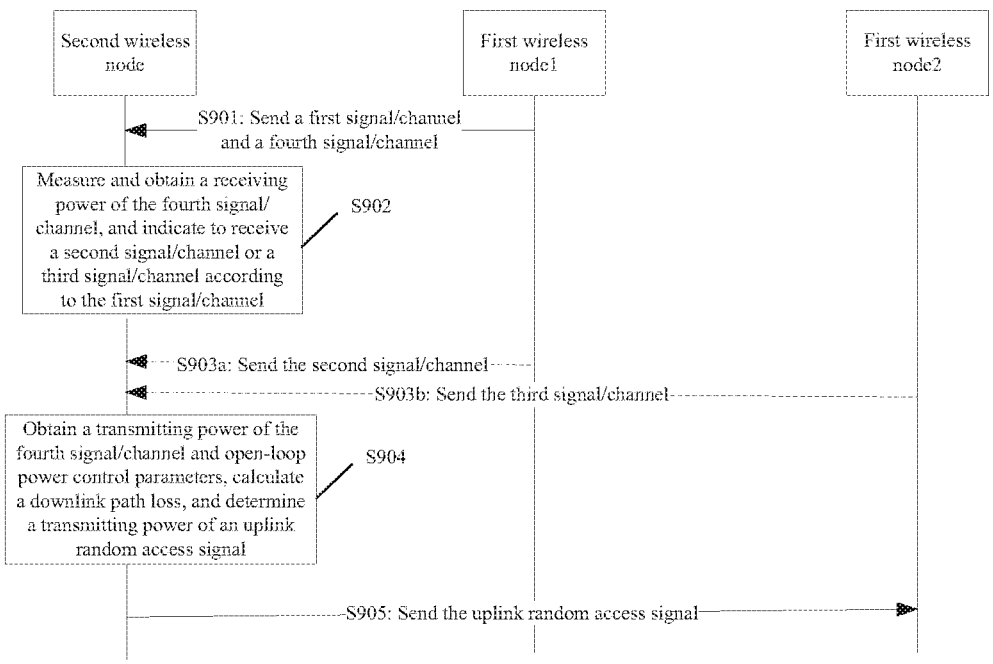
FIG. 13 is a flowchart of the method for open-loop power control according to embodiment 9 of the disclosure.

In the present embodiment, a method for open-loop power control is provided. As illustrated in FIG. 13, the flow includes the following operations.

At block S901, a base station 1 sends a synchronization signal/channel and a CRS.

Preferably, the base station 1 may be a base station using new RAT system.

Preferably, the synchronization signal/channel may be a narrowband signal/channel and sent by occupying a part of a downlink bandwidth.

Preferably, the CRS may be a wideband signal, and may be discretely or continuously distributed and sent on all of the downlink bandwidth.

At block S902, the terminal measures and obtains a receiving power of the CRS, and indicates whether a broadcast signal or an access configuration set is received according to the synchronization signal/channel.

Preferably, the terminal may detect the synchronization signal/channel to establish downlink synchronization with the base station 1.

Preferably, the receiving power of the CRS may be a signal receiving power on which high-layer filtering is performed.

Preferably, indication may be given by a certain bit in a sequence of the synchronization signal/channel, for example, the last bit in the sequence of the synchronization signal/channel. When the bit is 1, it is indicated that the terminal is required to receive a broadcast signal/channel from the base station 1, and block S903a is performed. When the bit is 0, it is indicated that the terminal is required to obtain the access configuration set from the base station 2, and block S903b is performed.

At block S903a, the base station 1 sends the broadcast signal/channel carrying a transmitting power of the CRS and open-loop power control parameters.

Preferably, there may be a multiple relationship between a transmission period/frequency of the broadcast signal/channel and a transmission period/frequency of the synchronization signal/channel. Sending one synchronization signal/channel corresponds to sending multiple broadcast signals/channels.

Preferably, there is a fixed location relationship between a location of a time domain resource and/or a location of a frequency domain resource occupied for sending the broadcast signal/channel and a location of a time domain resource and/or a location of a frequency domain resource occupied for sending the synchronization signal/channel. For example, when the synchronization signal/channel is sent on the nth sub-frame, the broadcast signal/channel is sent on the (n+3)-th sub-frame.

At block S903b, a base station 2 sends the access configuration set carrying a transmitting power of the CRS and the open-loop power control parameters.

Preferably, the access configuration set may include multiple access configuration messages. Different IDs of synchronization signal/channels correspond to different access configuration messages.

Preferably, the base station 2 may be a base station using an LTE system.

At block S904, the terminal receives and obtains the transmitting power of the CRS and the open-loop power control parameters, calculates a downlink path loss, and determines a transmitting power of an uplink random access signal.

At block S905, the terminal sends the uplink random access signal.

Those skilled in the art may understand that, all or a part of the steps in the above methods can be performed by programs to instruct related hardware (such as a processor). The programs may be stored in a computer readable storage medium, for example, an ROM, a magnetic disk, or a compact disk. Alternatively, all or a part of the steps in the above embodiments may also be implemented by using one or more integrated circuits. Correspondingly, each module/unit in the embodiments may be realized in hardware, for example, a corresponding function is implemented by an integrated circuit. Each module/unit in the embodiments may also be implemented by a software function module, for example, a corresponding function is implemented by a processor to execute programs/instructions stored in a memory. The disclosure is not limited to a combination of hardware and software in any specific form.

Although the embodiments disclosed by the disclosure are as described above, the content is the embodiments for facilitating understanding the disclosure, and not intended to limit the disclosure. Those skilled in the art may make any modification and variation to the forms and details of the implementation without departing from the spirit and scope of the disclosure, but the scope of protection of the disclosure is still subject to the scope defined by the appended claims.

INDUSTRIAL APPLICABILITY

The method and the device for open-loop power control provided by the embodiments of the disclosure are related to the field of wireless communications. The method includes the following operations. A first signal/channel is sent to a second wireless node; and a transmitting power of the first signal/channel is indicated to the second wireless node. Or, a first signal/channel and a fourth signal/channel are sent to a second wireless node; and a transmitting power of the fourth signal/channel is indicated to the second wireless node. The transmitting power is used to calculate a downlink path loss and determine a transmitting power of an uplink random access signal by the second wireless node. It can ensure that an uplink random access request is sent by using an appropriate transmitting power in a user-centric access scenario, thereby resisting an effect of the path loss and preventing interference between uplink users.

The invention claimed is:

1. A method for open-loop power control, applied to a first wireless node and comprising:
   the following two steps (a1)-(a2), or the following two steps (b1)-(b2),
   (a1) sending a first signal/channel to a second wireless node;
   (a2) indicating a transmitting power of the first signal/channel to the second wireless node;
   (b1) sending the first signal/channel and a fourth signal/channel to a second wireless node;
   (b2) indicating a transmitting power of the fourth signal/channel to the second wireless node;
   wherein the step (a2) comprises step (a21): carrying the transmitting power of the first signal/channel in a second signal/channel or a third signal/channel and sending the transmitting power of the first signal/channel to the second wireless node, and indicating by the first signal/channel that the transmitting power used to send the first signal/channel by the first wireless node is carried in the second signal/channel or the third signal/channel,
   wherein the step (b2) comprises step (b21): carrying the transmitting power of the fourth signal/channel in the second signal/channel or the third signal/channel and sending the transmitting power of the fourth signal/channel to the second wireless node, and indicating by the first signal/channel that the transmitting power used to send the fourth signal/channel by the first wireless node is carried in the second signal/channel or the third signal/channel, wherein in the steps (a1)-(a2) and the steps (b1)-(b2), the transmitting power is used to calculate a downlink path loss and determine an uplink transmitting power by the second wireless node, the first signal/channel is used for synchronization and configured to indicate an acquisition mode of the transmitting power, and the first signal/channel is a narrowband signal/channel, and sent by occupying a part of the downlink bandwidth, wherein in the step (a21) and step (b21), one of:

at least one of a transmission period or a frequency of the second signal/channel is the same as at least one of a transmission period or a frequency of the first signal/channel; or, there is a multiple relationship between at least one of a transmission period or a frequency of the second signal/channel and at least one of a transmission period or a frequency of the first signal/channel, and wherein the first signal/channel is a synchronization signal/channel or a new discovery reference signal (N-DRS), the second signal/channel is a payload of the synchronization signal or a broadcast signal/channel, the third signal/channel is an access configuration set, the third signal/channel and the first signal/channel are sent by different first wireless nodes, the fourth signal/channel is a cell-specific reference signal (CRS) or a channel state information reference signal (CSI-RS), the second signal/channel or the third signal/channel comprises open-loop power control parameters.

2. The method according to claim 1, wherein the open-loop power control parameters comprise at least one of: maximum transmitting power information, target receiving power information, deviation information on power demands of different types of preamble sequences, accessing times information, information on a step size of incremental power, or compensation adjustment amount information, and wherein the compensation adjustment amount information is used for compensating the downlink path loss or the uplink transmitting power.

3. The method according to claim 1, wherein at least one of a time domain resource or a frequency domain resource occupied for sending the second signal/channel is located on a fixed physical resource; or, there is a location correspondence between at least one of a location of a time domain resource or a location of a frequency domain resource occupied for sending the second signal/channel and at least one of a location of a time domain resource or a location of a frequency domain resource occupied for sending the first signal/channel.

4. The method according to claim 1, wherein the third signal/channel comprises at least one access configuration message, and the access configuration message carries a transmitting power for sending the first signal/channel or a transmitting power for sending the fourth signal/channel by the first wireless node using the access configuration message.

5. The method according to claim 1, wherein the different first wireless nodes are first wireless nodes in different systems, and the different systems comprise one of Global System for Mobile Communications (GSM), Long-Term Evolution (LTE) system, Universal Mobile Telecommunication System (UMTS), and new Radio Access Type (RAT) system.

6. The method according to claim 1, wherein the step (a2) further comprises:

providing a mapping relationship between the transmitting power of the first signal/channel and an Identity (ID) of the first signal/channel;

wherein the step (b2) further comprises:

a beam direction for sending the fourth signal/channel is the same as a beam direction for sending the second signal/channel.

7. The method according to claim 1, wherein the first signal/channel is used for cell discovery, and the fourth signal/channel is sent on all of a downlink bandwidth discretely or continuously.

8. A method for open-loop power control, applied to a second wireless node and comprising:

the following five steps (a1)-(a5), or the following five steps (b1)-(b5), (a1) receiving a first signal/channel from a first wireless node, (a2) measuring and obtaining a receiving power of the first signal/channel, (a3) obtaining at least one of a transmitting power of the first signal/channel or open-loop power control parameters according to an acquisition mode of the transmitting power indicated by the first signal/channel, wherein in the step (a3), the obtaining a transmitting power of the first signal/channel comprises step (a31): acquiring the transmitting power of the first signal/channel from the first wireless node in a second signal/channel or a third signal/channel, and the obtaining open-loop power control parameters comprises step (a32): acquiring the open-loop power control parameters from the second signal/channel or the third signal/channel, (a4) calculating a downlink path loss, and (a5) determining an uplink transmitting power, wherein the step (a4) comprises step (a41): calculating the downlink path loss according to at least one of the receiving power of the first signal/channel and the transmitting power of the first signal/channel or the open-loop power control parameters;

(b1) receiving the first signal/channel and a fourth signal/channel from the first wireless node, (b2) measuring and obtaining a receiving power of the fourth signal/channel, (b3) obtaining at least one of the transmitting power of the fourth signal/channel or open-loop power control parameters according to the acquisition mode of the transmitting power indicated by the first signal/channel, wherein in the step (b3), the obtaining the transmitting power of the fourth signal/channel comprises step (b31): acquiring the transmitting power of the fourth signal/channel from the first wireless node in the second signal/channel or the third signal/channel, and the obtaining open-loop power control parameters comprises step (b32): acquiring the open-loop power control parameters from the second signal/channel or the third signal/channel, (b4) calculating a downlink path loss, wherein the step (b4) comprises step (b41): calculating the downlink path loss according to at least one of the receiving power of the fourth signal/channel and the transmitting power of the fourth signal/channel or the open-loop power control parameters, and (b5) determining an uplink transmitting power;

wherein in the steps (a1)-(a5) and the steps (b1)-(b5), the first signal/channel is used for synchronization and configured to indicate the acquisition mode of the transmitting power, and the first signal/channel is a narrowband signal/channel, and sent by occupying a part of the downlink bandwidth, wherein in the steps (a31)-(a32), and (b31)-(b32), one of:
at least one of a receiving period or a frequency of the second signal/channel is the same as at least one of a receiving period or a frequency of the first signal/channel; or,
there is a multiple relationship between at least one of a receiving period or a frequency of the second signal/channel and at least one of a receiving period or a frequency of the first signal/channel, and
wherein the first signal/channel is a synchronization signal/channel or a new discovery reference signal (N-DRS), the second signal/channel is a payload of the synchronization signal or a broadcast signal/channel, the third signal/channel is an access configuration set, the third signal/channel and the first signal/channel are sent by different first wireless nodes, the fourth signal/channel is a cell-specific reference signal (CRS) or a channel state information reference signal (CSI-RS), the second signal/channel or the third signal/channel comprises open-loop power control parameters.

9. The method according to claim 8, wherein obtaining the at least one of the transmitting power of the first signal/channel or the open-loop power control parameters, or obtaining the at least one of the transmitting power of the fourth signal/channel or the open-loop power control parameters comprises at least one of:
acquiring the transmitting power of the first signal/channel from the first wireless node according to a mapping relationship between the transmitting power of the first signal/channel and an Identity (ID) of the first signal/channel; or
wherein the open-loop power control parameters comprise at least one of: maximum transmitting power information, target receiving power information, deviation information on power demands of different types of preamble sequences, accessing times information, information on a step size of incremental power, or compensation adjustment amount information, and wherein the compensation adjustment amount information is used for compensating the downlink path loss or the uplink transmitting power.

10. The method according to claim 9, wherein at least one of a time domain resource or a frequency domain resource occupied for receiving the second signal/channel is located on a fixed physical resource; or, there is a location correspondence between at least one of a location of a time domain resource or a frequency domain resource occupied for receiving the second signal/channel and a location of a time domain resource or a frequency domain resource occupied for receiving the first signal/channel.

11. The method according to claim 8, wherein obtaining the transmitting power of the first signal/channel further comprises:
receiving access compensation adjustment amount information from the first wireless node, wherein the access compensation adjustment amount information is used to select the first wireless node by the second wireless node.

12. The method according to claim 11, wherein selecting the first wireless node by the second wireless node comprises:
estimating, by the second wireless node, a receiving power of a wideband signal based on the receiving power and the access compensation adjustment amount information from the first wireless node, and selecting the first wireless node.

13. The method according to claim 8, further comprising:
before calculating the downlink path loss and determining the uplink transmitting power,
receiving information on a number of first wireless nodes from the first wireless node; and
determining the uplink transmitting power based on the information on the number of the first wireless nodes.

14. A device for open-loop power control, provided on a second wireless node and comprising:
a processor; and
a memory storing instructions, which, when executed by the processor, cause the processor to execute operations comprising:
the following five steps (a1)-(a5), or the following five steps (b1)-(b5),
(a1) receiving a first signal/channel from a first wireless node,
(a2) measuring and obtaining a receiving power of the first signal/channel,
(a3) obtaining at least one of a transmitting power of the first signal/channel or open-loop power control parameters according to an acquisition mode of the transmitting power indicated by the first signal/channel, wherein in the step (a3), the obtaining a transmitting power of the first signal/channel comprises step (a31): acquiring the transmitting power of the first signal/channel from the first wireless node in a second signal/channel or a third signal/channel, and the obtaining open-loop power control parameters comprises step (a32): acquiring the open-loop power control parameters from the second signal/channel or the third signal/channel,
(a4) calculating a downlink path loss, and
(a5) determining an uplink transmitting power, wherein the step (a4) comprises step (a41): calculating the downlink path loss according to at least one of the receiving power of the first signal/channel and the transmitting power of the first signal/channel or the open-loop power control parameters;
(b1) receiving the first signal/channel and a fourth signal/channel from the first wireless node,
(b2) measuring and obtaining a receiving power of the fourth signal/channel,
(b3) obtaining at least one of the transmitting power of the fourth signal/channel or open-loop power control parameters according to the acquisition mode of the transmitting power indicated by the first signal/channel, wherein in the step (b3), the obtaining the transmitting power of the fourth signal/channel comprises step (b31): acquiring the transmitting power of the fourth signal/channel from the first wireless node in the second signal/channel or the third signal/channel, and the obtaining open-loop power control parameters comprises step (b32): acquiring the open-loop power control parameters from the second signal/channel or the third signal/channel,
(b4) calculating a downlink path loss, wherein the step (b4) comprises step (b41): calculating the downlink path loss according to at least one of the receiving power of the fourth signal/channel and the transmitting power of the fourth signal/channel or the open-loop power control parameters, and
(b5) determining an uplink transmitting power;
wherein in the steps (a1)-(a5) and the steps (b1)-(b5), the first signal/channel is used for synchronization and configured to indicate the acquisition mode of the transmitting power, and the first signal/channel is a narrowband signal/channel, and sent by occupying a part of the downlink bandwidth, wherein in the steps (a31)-(a32), and (b31)-(b32), one of:

at least one of a receiving period or a frequency of the second signal/channel is the same as at least one of a receiving period or a frequency of the first signal/channel; or, there is a multiple relationship between at least one of a receiving period or a frequency of the second signal/channel and at least one of a receiving period or a frequency of the first signal/channel, and wherein the first signal/channel is a synchronization signal/channel or a new discovery reference signal (N-DRS), the second signal/channel is a payload of the synchronization signal or a broadcast signal/channel, the third signal/channel is an access configuration set, the third signal/channel and the first signal/channel are sent by different first wireless nodes, the fourth signal/channel is a cell-specific reference signal (CRS) or a channel state information reference signal (CSI-RS), the second signal/channel or the third signal/channel comprises open-loop power control parameters.

15. The device according to claim 14, wherein obtaining the transmitting power of the first signal/channel further comprises:

acquiring the transmitting power of the first signal/channel from the first wireless node according to a mapping relationship between the transmitting power of the first signal/channel and an Identity (ID) of the first signal/channel.

16. The device according to claim 14, wherein obtaining the transmitting power of the first signal/channel further comprises:

receiving access compensation adjustment amount information from the first wireless node, wherein the access compensation adjustment amount information is used to select the first wireless node by the second wireless node;

wherein selecting the first wireless node by the second wireless node comprises:

estimating, by the second wireless node, a receiving power of a wideband signal based on the receiving power and the access compensation adjustment amount information from the first wireless node, and selecting the first wireless node.

17. The device according to claim 14, wherein the operations further comprise:

receiving information on a number of first wireless nodes from the first wireless node; and determining the uplink transmitting power based on the information on the number of the first wireless nodes.

* * * * *